(12) United States Patent
Baracaldo-Angel et al.

(10) Patent No.: US 11,689,566 B2
(45) Date of Patent: Jun. 27, 2023

(54) DETECTING AND MITIGATING POISON ATTACKS USING DATA PROVENANCE

(71) Applicant: International Business Machines Corporation, Armonk, NY (US)

(72) Inventors: Nathalie Baracaldo-Angel, San Jose, CA (US); Bryant Chen, San Jose, CA (US); Evelyn Duesterwald, Millwood, NY (US); Heiko H. Ludwig, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1338 days.

(21) Appl. No.: 16/031,953

(22) Filed: Jul. 10, 2018

(65) Prior Publication Data

US 2020/0019821 A1 Jan. 16, 2020

(51) Int. Cl.
*H04L 9/40* (2022.01)
*G06N 20/00* (2019.01)
(Continued)

(52) U.S. Cl.
CPC ........ *H04L 63/1466* (2013.01); *G06F 18/217* (2023.01); *G06F 18/2113* (2023.01); *G06N 20/00* (2019.01); *H04L 63/1441* (2013.01)

(58) Field of Classification Search
CPC .... G06K 9/6262; G06K 9/623; G06K 9/6298; G06K 9/6256; G06N 20/00;
(Continued)

(56) References Cited

U.S. PATENT DOCUMENTS 8,819,064 B2 * 8/2014 Olston .................... G06F 16/25
707/779
9,069,808 B2 6/2015 Kementsietsidis et al.
(Continued)

FOREIGN PATENT DOCUMENTS

CN 106934462 A 7/2017

OTHER PUBLICATIONS

Cloud Security Alliance, "Big Data Security and Privacy Handbook: 100 Best Practices in Big Data Security and Privacy," Big Data Working Group, 2016, pp. 1-63.
(Continued)

*Primary Examiner* — Christopher M Brandt
(74) *Attorney, Agent, or Firm* — Zilka-Kotab, P.C.

(57) ABSTRACT

Computer-implemented methods, program products, and systems for provenance-based defense against poison attacks are disclosed. In one approach, a method includes: receiving observations and corresponding provenance data from data sources; determining whether the observations are poisoned based on the corresponding provenance data; and removing the poisoned observation(s) from a final training dataset used to train a final prediction model. Another implementation involves provenance-based defense against poison attacks in a fully untrusted data environment. Untrusted data points are grouped according to provenance signature, and the groups are used to train learning algorithms and generate complete and filtered prediction models. The results of applying the prediction models to an evaluation dataset are compared, and poisoned data points identified where the performance of the filtered prediction model exceeds the performance of the complete prediction model. Poisoned data points are removed from the set to generate a final prediction model.

20 Claims, 15 Drawing Sheets

(51) Int. Cl.
  *G06F 18/21* (2023.01)
  *G06F 18/2113* (2023.01)
(58) Field of Classification Search
  CPC ............... H04L 63/1441; H04L 63/123; H04L 63/1466; H04L 2463/145
  See application file for complete search history.

(56) References Cited

U.S. PATENT DOCUMENTS

| | | | |
|---|---|---|---|
| 9,509,690 | B2 | 11/2016 | Carter et al. |
| 10,013,656 | B1* | 7/2018 | Ciarlini .................. G06F 9/453 |
| 2017/0093905 | A1 | 3/2017 | Ng et al. |
| 2019/0251479 | A1* | 8/2019 | Anderson ........... H04L 63/1466 |

OTHER PUBLICATIONS

Smutz et al., "Malicious PDF Detection using Metadata and Structural Features," ACSAC, ACM, Dec. 3-7, 2012, pp. 239-248.

Anonymous, "Record Level Change Tracking Included within a Data Set," IP.com, IPCOM000239805D, Dec. 32, 2014, 3 pages.

Anonymous, "Method and System for Detecting and Recovering Corrupted Critical Data Structures," IP.com, IPCOM000224146D, Dec. 11, 2012, 4 pages.

Anonymous, "A method and system for injecting corrupt data in order to increase test coverage," IP.com, PCOM000194243D, Mar. 19, 2010, 3 pages.

Aman et al., "Secure Data Provenance for the Internet of Things," Proceedings of the 3rd ACM InternationalWorkshop an IoT Privacy, Trust, and Security (IoTPTS '17), Apr. 2017, pp. 1-4.

Barreno et al., "The security of machine learning," Machine Learning, vol. 81, 2010, pp. 121-148.

Biggio et al., "Poisoning attacks against support vector machines," arXiv preprint, 2012, 8 pages retrived from https://arxiv.org/pdf/1206.6389v2.pdf.

Chakarov et al., "Debugging Machine Learning Tasks," arXiv preprint, 2016, pp. 1-29 retrieved from https://arxiv.org/pdf/1603.07292.pdf.

Gadelha et al., "Kairos: An Architecture for Securing Authorship and Temporal Information of Provenance Data in Grid-Enabled Workflow Management Systems," Fourth International Conference on e-Science, e-Science 2008, Dec. 7-12, 2008, 8 pages.

Hasan et al., "The Case of the Fake Picasso: Preventing History Forgery with Secure Provenance," Fast '09, 7th USENIX Conference on File and Storage Technologies, Feb. 2009, pp. 1-14 retrieved from https://www.usenix.org/legacy/event/fast09/tech/full_papers/hasan/hasan.pdf.

Lyle et al., "Trusted Computing and Provenance: Better Together," Proceedings of the Usenix 2nd Workshop on the Theory and Practice of Provenance, 2010, pp. 1-10 retrieved from https://www.usenix.org/legacy/event/tapp10/tech/full_papers/lyle.pdf.

Nelson et al., "Misleading Learners: Co-opting Your Spam Filter," Machine Learning in Cyber Trust: Security, Privacy and Reliability, Springer, 2009, pp. 17-51.

Nelson et al., "Exploiting Machine Learning to Subvert Your Spam Filter," Proceedings of First USENIX Workshop on Large Scale Exploits and Emergent Threats, Apr. 2008, pp. 1-9.

Nelson B., "Behavior of Machine Learning Algorithms in Adversarial Environments," Dissertation, University of California, Berkeley, 2010, 244 pages.

Rangwala et al., "A Mutual Agreement Signature Scheme for Secure Data Provenance," IEEE, 2014, pp. 726-733.

Wang et al., "Chaining for Securing Data Provenance in Distributed Information Networks," MILCOM, 2012, pp. 1-6 retrieved from http://spirit.cs.ucdavis.edu/pubs/conf/Oscar_MILCOM12.pdf.

Zhou et al., "Adversarial Support Vector Machine Learning," KDD'12, ACM, Aug. 2012, 9 pages.

Huang et al., "Adversarial Machine Learning," Proceedings of the 4th ACM Workshop on Security and Artificial Intelligence, Oct. 2011, pp. 43-57.

Gu et al., "BadNets: Identifying Vulnerabilities in the Machine Learning Model Supply Chain," CoRR, 2017, 13 pages retrieved from https://arxiv.org/pdf/1708.06733.pdf.

Liu et al., "Trojaning Attack on Neural Networks," Purdue University, Purdue e-Pubs, 2017, 17 pages.

Baracaldo et al., "Securing Data Provenance in Internet of Things (IoT) Systems," Computer Science, 2017, 7 pages.

Anonymous, "Appendix for ICIOT Submission," retrieved from https://www.dropbox.com/sh/rmwdp1ji2h0a40i/AAAuoVNm0cxavRxEgY1N18cQa?dl=0 on Jun. 5, 2018, 5 pages.

Papernot et al., "SoK: Towards the Science of Security and Privacy in Machine Learning," Cornell University Library, Nov. 2016, pp. 1-19 retrived from https://arxiv.org/pdf/1611.03814.pdf.

Biggio et al., "Security Evaluation of Pattern Classifiers under Attack," IEEE Transactions on Knowledge and Data Engineering, vol. 26, No. 4, Apr. 2014, pp. 1-14.

Baracaldo et al., "Mitigating Poisoning Attacks on Machine Learning Models: A Data Provenance Based Approach," AISec'17, Session: Defense against Poisoning, Nov. 3, 2017, pp. 103-110.

Xu et al., "Robustness and Regularization of Support Vector Machines," Journal of Machine Learning Research, vol. 10, 2009, pp. 1485-1510.

Biggio et al., "Support Vector Machines Under Adversarial Label Noise," Asian Conference on Machine Learning, JMLR: Workshop and Conference Proceedings, vol. 20, 2011, pp. 97-112.

Biggio et al., "Poisoning Behavioral Malware Clustering," AISec'14,, Nov. 7, 2014, 10 pages.

Kloft et al., "Online Anomaly Detection under Adversarial Impact," Proceedings of the 13th International Conference on Artificial Intelligence and Statistics, 2010, pp. 405-412.

Han et al., "FRAPpuccino: Fault-detection through Runtime Analysis of Provenance," Harvard University, 2017, 7 pages.

Braun et al., "Securing Provenance," HotSec, 2008, 5 pages retrieved from https://www.usenix.org/legacy/events/hotsec08/tech/full_papers/braun/braun.pdf.

Mozaffari-Kermani et al., "Systematic Poisoning Attacks on and Defenses for Machine Learning in Healthcare," IEEE Journal of Biomedical and Health Informatics, vol. 19, No. 6, Nov. 2015, pp. 1893-1905.

Liu et al., "Neural Trojans," IEEE 35th International Conference on Computer Design, 2017, pp. 45-48.

Gardiner et al., "On the security of machine learning in malware C&C detection: a survey," ACM Computing Surveys, 2016, 38 pages.

Li et al., "An Improved Reject on Negative Impact Defense," ICMLC 2014, CCIS 481, 2014, pp. 452-459.

Buneman et al., "Why and Where: A Characterization of Data Provenance," International Conference on Database Theory, 2001, pp. 1-15.

Olufowobi et al., exerpt from "Data Provenance Model for Internet of Things (IoT) Systems," exerpt from the International Conference on Service-Oriented Computing, 2016, 1 page.

Price, R., "Microsoft is deleting its AI chatbot's incredibly racist tweets," Business Insider, Mar. 24, 2016, 3 pages retrived from http://www.businessinsider.com/microsoft-deletes-racist-genocidal-tweets-from-ai-chatbot-tay-2016-3.

Baracaldo-Angel et al., U.S. Appl. No. 18/125,033, filed Mar. 23, 2023.

* cited by examiner ized by a same one of the provenance signatures; and for each group of the untrusted data points in the training dataset: training a supervised learning method using a first training dataset to generate a complete prediction model, wherein the first training dataset includes all of the untrusted data points; training the supervised learning method using a second training dataset to generate a filtered prediction model, where the second training dataset excludes the group of the untrusted data points; generating a new evaluation dataset by removing, from the full evaluation dataset, any data points sharing a provenance signature with one or more data points of the second training dataset; applying each of the complete prediction model and the filtered prediction model to the new evaluation dataset; and comparing a performance of applying the complete prediction model to the new evaluation dataset to a performance of applying the filtered prediction model to the new evaluation dataset to determine whether the performance of applying the filtered prediction model to the new evaluation dataset exceeds the performance of applying the complete prediction model to the new evaluation dataset. In response to determining the performance of applying the filtered prediction model to the new evaluation dataset exceeds the performance of applying the complete prediction model to the new evaluation dataset, the method includes: designating as poisonous one or more data points, in both the training dataset and the full evaluation dataset, the one or more data points having a same provenance signature as: (1) the group of untrusted data points excluded from the second training dataset; and (2) the data points removed from the full evaluation dataset based on sharing the provenance signature with the one or more data points of the second training dataset. The method still further includes removing the one or more poisonous data points from the training dataset and the full evaluation dataset; recombining the training dataset and full evaluation dataset after removing the one or more poisonous data points therefrom so as to create a final filtered training set; and training a final prediction model using the final filtered training set.

DETECTING AND MITIGATING POISON ATTACKS USING DATA PROVENANCE

BACKGROUND

The present invention relates to machine learning (ML), and more particularly to detecting and mitigating poisoning attacks on an ML system, algorithm, etc. using data provenance. The invention concerns protecting training data used to train the ML system/algorithm, as well as detecting poison attacks under fully untrusted data sources.

ML attracts ever increasing intention and achieves increasing performance as computer science focuses on development of artificial intelligence and other intelligent computerized solutions to complex technological problems. Indeed, the use of ML models has become ubiquitous. Their predictions are used to make decisions about healthcare, security, investments and many other critical applications. Given this pervasiveness, it is not surprising that adversaries have an incentive to manipulate ML models to their advantage. One way of manipulating a model is through a poisoning or causative attack in which the adversary feeds carefully crafted poisonous data points into the training set.

The reliance of ML methods on quality training data presents a security vulnerability in which adversaries may inject poisonous samples into the training dataset to manipulate the learned classifier. Defending against these types of attacks, called poisoning or causative attacks, is particularly challenging in online learning and other environments where the model must be periodically retrained to account for dataset shifts.

As a result, most poison attacks are only detected upon successful manipulation of the training set by the adversary, when at least some damage to the output of the ML algorithm has occurred and which may be difficult or impossible to determine forensically.

Accordingly, it would be advantageous to provide systems and techniques for detecting and mitigating poison attacks in a proactive manner.

SUMMARY

According to one embodiment, a computer-implemented method for provenance-based defense against poison attacks includes: receiving one or more observations from one or more data sources, wherein each observation comprises one or more features for training a final prediction model; receiving provenance data corresponding to each observation; determining whether some or all of the observations are poisoned based at least in part on the corresponding provenance data; and in response to determining some or all of the observations are poisoned, removing the poisoned observation(s) from a final training dataset used to train the final prediction model.

According to another embodiment, a computer-implemented method for provenance-based defense against poison attacks in a fully untrusted data environment, includes: receiving a dataset and associated provenance data, wherein the dataset comprises a plurality of untrusted data points and excludes trusted data points, wherein each untrusted data point is associated with one or more provenance signatures of the provenance data; randomly assigning a first portion of the untrusted data points to a training dataset; randomly assigning a second portion of the untrusted data points to a full evaluation dataset; grouping the untrusted data points of the training dataset into a plurality of groups each characterized by a different one of the provenance signatures, wherein untrusted data points of each group are character- Other aspects and embodiments of the present invention will become apparent from the following detailed description, which, when taken in conjunction with the drawings, illustrate by way of example the principles of the invention.

DETAILED DESCRIPTION

Figure 1:
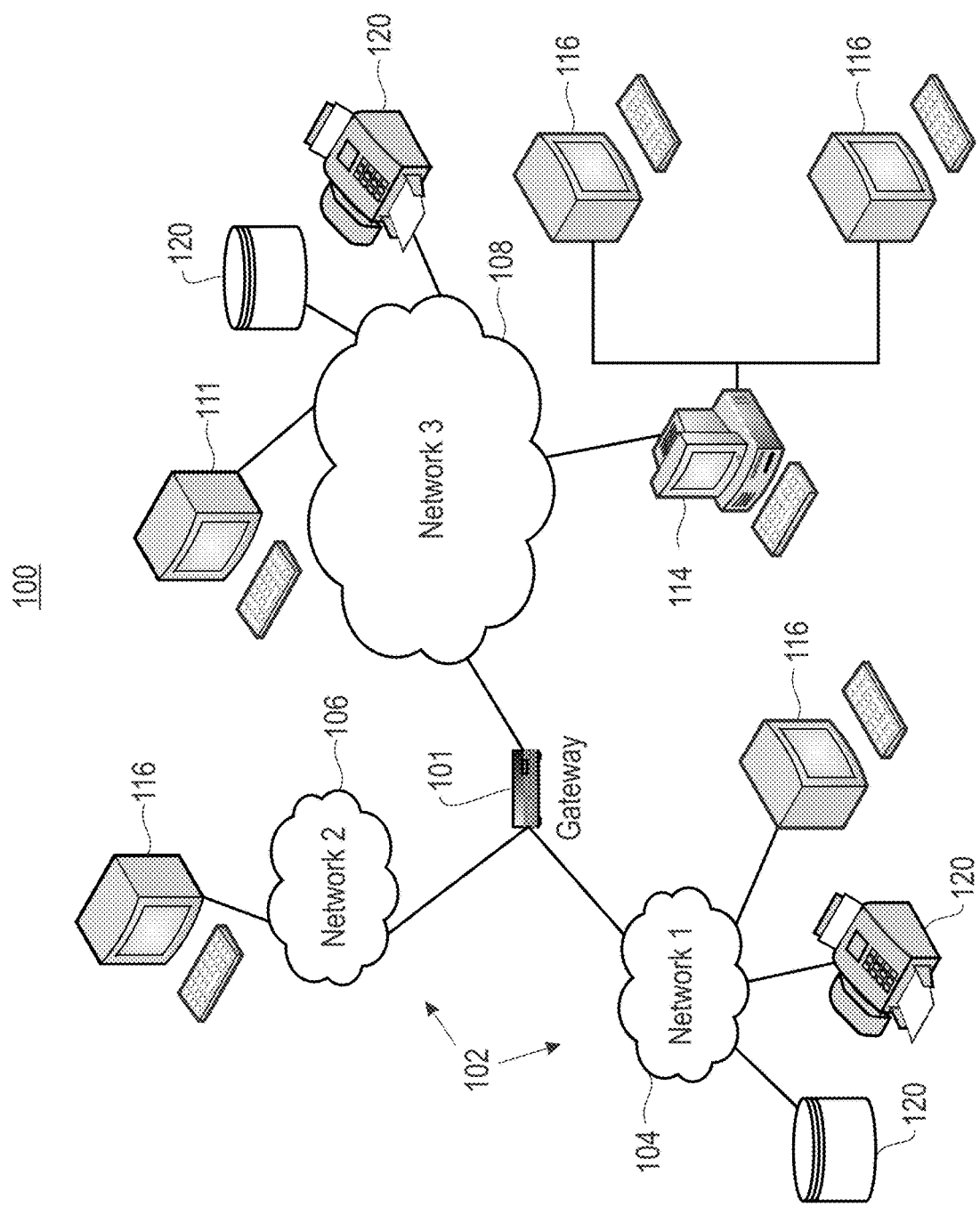
FIG. 1 illustrates a network architecture, in accordance with one embodiment.

The following description discloses several preferred embodiments of systems, methods and computer program products for detecting and mitigating poisoning attacks using data provenance. Various embodiments provide systems, techniques, and computer program products for detecting and mitigating poisoning attacks where available data are partially trusted, fully untrusted, and even in the event of targeted attacks.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

As utilized herein, "provenance data" refers to the lineage or data associated with a data point and shows the operations that led to its creation, origin and manipulation. This may include information about the device from which the data was gathered, including but not limited to: a firmware version, a user id, a timestamp (e.g. corresponding to transmission and/or receipt of data from the source), a unique network ID (such as a MAC address or other unique network identifier), physical location information (such as GPS coordinates, server rack and node number, etc.), data curator, annotator, transforming operations performed on the by any software agent, an identifier of the source of the data, historical statistics (such as reputation information collected from social media), and any equivalents thereof that would be appreciated by a person having ordinary skill in the art upon reading this disclosure. Importantly, provenance data are not easily modifiable by an adversary seeking to poison a given system. Hence, provenance data are considered "trusted." In preferred approaches, provenance data are associated with corresponding data as metadata.

In various embodiments data points generated by sensors or other devices may be abbreviated as (dp), and generally include one or more observations, each observation including or being computed based on the data points. For instance, in several exemplary approaches observations may include a data point per se, an image, a set, etc. as would be understood by a person having ordinary skill in the art upon reading the present descriptions. Provenance data associated with a given data point $(dp_i)$ may be denoted $prov(dp_i)$. Provenance data $prov(dp_i)$ may include one or more types of provenance data as defined hereinabove, and where multiple types of provenance data are included, they may be modeled as a set.

A "provenance framework" is preferably deployed to record the lineage of data points received for training. The provenance framework provides a "provenance record" for each data point collected, and the provenance record contains one or more "provenance features" reflecting the lineage of the data point. A value of a given provenance feature, e.g., a specific environmental sensor or firmware version, is called a "provenance signature." The set of collected data points sharing a provenance signature is called the "data segment" of this signature.

"Trusted" data shall be understood as including any data obtained from a trusted source employing a successful mechanism or technique for preventing unauthorized manipulation of the data. Examples of such sources include frameworks that employ protective mechanisms such as physical unclonable functions, blockchain, industry-trusted computing platforms, trusted platform modules, human operator verifiers, certified and calibrated sensors, authenticated agents and/or services such as those requiring a user log in or otherwise authenticate the user's identity to access corresponding data and/or services, unique identifiers (especially unique identifiers capable of being verified only by a trusted third party or service), and equivalents thereof that will be appreciated by a person having ordinary skill in the art upon reading the present descriptions. As noted above, another example of trusted data is provenance data.

"Untrusted" data shall be understood as data that is not trusted data. Untrusted data is obtained from any source that is not a trusted source, and in some embodiments may include data collected using multiple sources. In other words, a given feature vector within an untrusted dataset may include individual features (data points) from multiple different sources. Exemplary forms of untrusted data include sensor data, e.g. data from sensor devices used to monitor a particular environment, sensor devices used to monitor health care conditions, etc. as would be appreciated by a person having ordinary skill in the art upon reading the present disclosure. Other exemplary forms of untrusted data include user traffic (especially I/O) such as user feedback to a system, e.g. in the form of consumer satisfaction ratings, text comments, etc. as would be understood by a person having ordinary skill in the art upon having read the instant descriptions. Of course, the foregoing examples of untrusted data are provided for illustrative purposes only, and untrusted data shall generally be understood as encompassing any and all data that do not comport with the foregoing definition of "trusted" data.

Datasets may include trusted and/or untrusted data, in accordance with various aspects of the inventive concepts presented herein. Where a dataset consists of trusted data, the dataset is termed a "fully trusted dataset." Where a dataset includes trusted and untrusted data, the dataset is termed a "partially trusted" dataset. Where a dataset consists of untrusted data, the dataset is termed a "fully untrusted" dataset.

"Poison attacks" are to be understood as malicious attempts to manipulate an ML model by feeding carefully crafted "poisonous" data into a training set used to train/retrain the ML model. Poison attacks therefore influence the decisions reached by the ML algorithm by drawing the decision model toward a desired outcome, or away from undesired outcomes, based on the poisonous data points impacting the training process used to tailor the algorithm. Generally, poison attacks seek to either: (1) reduce the accuracy of the ML algorithm; or (2) cause the ML algorithm to misclassify data points into a particular, targeted classification (e.g. to encourage certain products being classified as beneficial such as a chemical substance classified as biodegradable or otherwise non-polluting, encourage classifying anomalous data points as normal, etc. as would be appreciated by a person having ordinary skill in the art upon reading the present descriptions).

Upon reading the present disclosure in its entirety, skilled artisans will appreciate that using provenance data to detect and/or mitigate poison attacks represents several advantages relative to conventional techniques for addressing malicious attempts to manipulate data.

First, existing model-specific data sanitation techniques fail to recognize adversarial patterns that are detectable only by evaluating the impact of particular provenance data in the ML model, such as associations with specific data sources, specific timing patters, specific physical and/or virtual locations (e.g. GPS addresses and/or network addresses, respectively).

Second, using provenance data as described herein enables proactive detection of poison attacks, preventing or mitigating the damage caused to the ML system/algorithm.

Figure 4A:
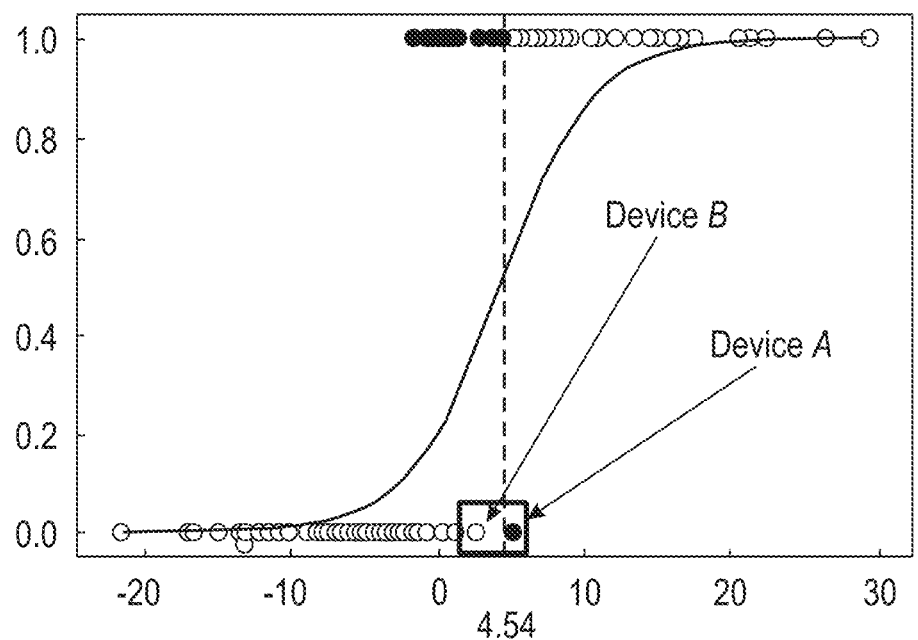
FIG. 4A is a graph showing an example training dataset including at least one poisoned data point from a poisoned data source A, and a corresponding logistic regression model, according to one embodiment.

Third, and as shown empirically in FIGS. 4A-4C (described in greater detail below), the presently disclosed inventive concepts improve the accuracy and fidelity of detecting poisoned data points within a given dataset, improving the degree of protection afforded to the ML algorithm. Moreover, as illustrated by the particular example represented in FIGS. 4A-4C, the provenance-based techniques described herein facilitate detection of poison attacks even where an adversary carries out a targeted attack intended to hide or obfuscate detection of other poisoned data points within a dataset.

Fourth, the presently disclosed inventive concepts allow users to leverage a-priori knowledge of the type of poison injected by adversaries, vulnerabilities in the data collection process, and mechanism of poisonous data insertion by adversaries to aid the detection and filtering process.

Fifth, the presently disclosed inventive concepts are more computationally efficient than conventional techniques for detecting presence of poisoned data because the inventive approach presented herein tests multiple data points simultaneously, without requiring any clustering of the data. For instance, in an experimental evaluation of the presently disclosed inventive techniques as applied to a partially trusted dataset, versus performance of a baseline, conventional defense known as Calibrated Reject on Negative Impact (RONI), the presently described inventive approaches required consistently less (approx. 2-3 fold) runtime than RONI. While both the provenance method and the baseline (RONI) can be parallelized, the baseline method requires complexity on the order of O(m) times more models to be trained, where m is the average number of data points per segment. Thus, even when fully parallelized, the baseline method would require O(m) times more resources such as the number of CPU cores and memory. In an unparallelized setting, it is likewise expected that the computation time to take O(m) times longer using the baseline method. While the comparison was not performed for fully untrusted datasets, since RONI requires at least some trusted data, similar performance improvements are expected for embodiments of the inventive concepts utilizing/evaluating fully untrusted datasets.

Sixth, provenance data-based detection and mitigation of poison attacks mitigates the effects of poor test set coverage by evaluating sets of points simultaneously. Prior methods like RONI rely on an evaluation or test set to assess whether data points are poisonous. However, if the size or coverage of the test set is not adequate, then poisonous data may go undetected. By evaluating whole data segments, rather than single data points as RONI does, the presently disclosed inventive concepts amplify the effect of poisonous data during evaluation, which mitigates the need for strong test set coverage.

Seventh, the presently disclosed inventive concepts allow the detection of poisonous data even when a trusted test or evaluation set is unavailable. The provenance data provide a mechanism to link data in a training set to data with the same provenance signature in a test or evaluation set. This allows the removal of that data from the test set when evaluating a provenance signature for poison, thereby preventing a data source from manipulating its own evaluation. Without data provenance, there is no way to link the data in the training set to the data in the evaluation set and it is not clear how to remove the influence of poisonous data in the evaluation process, requiring instead the usage of a trusted test set.

Accordingly, by utilizing provenance data as a unique mechanism to detect poison data and attacks, the presently disclosed inventive concepts represent an improvement to computer technology, and ML in particular, because these concepts involve the use of a unique mechanism (provenance data) to detect potential security breaches and prevent or mitigate the same. Doing so conveys the foregoing advantages on the system, and therefore represents an improvement to the function of the computer system implementing the inventive provenance data-based approaches described herein.

For instance, in one exemplary approach a municipality wishes to monitor air quality and predict future atmospheric conditions so as to issue appropriate warnings, instructions, and/or restrictions to relevant parties (e.g. to impose limits on driving or industrial activity to reduce air pollution, to issue fire hazard warnings, etc.). The municipality deploys a plurality of sensors to detect various air quality indicators. The sensors are protected physically by providing tamper-resistant enclosures, and are protected from a data standpoint by providing cryptographic keys to ensure provenance of the data transmitted by the sensor. The data collected by the sensors are processed by an ML algorithm to provide predictions as to future atmospheric conditions. To account for changes, e.g. in global weather patterns, acceptable risk levels, etc., the model is periodically recalibrated using a new or updated training set.

An adversary, e.g. a member of an industry contributing to air pollution, may poison the system by injecting false data points, thereby rendering the predictions less useful or wholly useless and frustrating the ability to regulate the corresponding industry. The adversary may inject false data points, e.g., by introducing certain compounds known to affect air quality in the vicinity of certain sensors, and/or at certain times (e.g. where and/or when the air quality is actually high, giving a false impression that the compounds in question are not detrimental to air quality and thus escaping regulation of those compounds or reducing confidence in the effectiveness of regulating the industry). If the ML algorithm is retrained using the poisoned dataset, the resulting predictions will be undesirably influenced according to the adversary's desired outcome. Using provenance data, the individual sensors (sources) of the poisoned data may be identified and eliminated from the training set to prevent or mitigate the impact of the poison attack.

In other cases, an explicit provenance framework may not be in place, but it is nevertheless possible to consider certain features to be trusted and indicative of the origin and lineage of the data. For example, if the training data consists of tweets, then the originating Twitter account can be considered as a provenance feature for the purpose of the inventive concepts described herein. While an account might be hacked, the account from which a particular tweet originated can generally be considered to be accurate.

Similarly, an adversary that attempts to manipulate a classifier trained to identify fraudulent credit card transactions may poison the training data by misreporting transactions to the credit card company. In this case, the adversary can manipulate various aspects of the transaction and its classification but cannot manipulate the account to which the transaction is posted. Twitter and credit card accounts are also examples of features that are indicative of how poisonous points might be concentrated and/or introduced into the training set, as adversaries are likely only able to manipulate a small portion of them.

According to one general embodiment, a computer-implemented method for provenance-based defense against poison attacks includes: receiving one or more observations from one or more data sources, wherein each observation comprises one or more features for training a final prediction model; receiving provenance data corresponding to each observation; determining whether some or all of the observations are poisoned based at least in part on the corresponding provenance data; and in response to determining some or all of the observations are poisoned, removing the poisoned observation(s) from a final training dataset used to train the final prediction model.

According to another general embodiment, a computer-implemented method for provenance-based defense against poison attacks in a fully untrusted data environment, includes: receiving a dataset and associated provenance data, wherein the dataset comprises a plurality of untrusted data points and excludes trusted data points, wherein each untrusted data point is associated with one or more provenance signatures of the provenance data; randomly assigning a first portion of the untrusted data points to a training dataset; randomly assigning a second portion of the untrusted data points to a full evaluation dataset; grouping the untrusted data points of the training dataset into a plurality of groups each characterized by a different one of the provenance signatures, wherein untrusted data points of each group are characterized by a same one of the provenance signatures; and for each group of the untrusted data points in the training dataset: training a supervised learning method using a first training dataset to generate a complete prediction model, wherein the first training dataset includes all of the untrusted data points; training the supervised learning method using a second training dataset to generate a filtered prediction model, where the second training dataset excludes the group of the untrusted data points; generating a new evaluation dataset by removing, from the full evaluation dataset, any data points sharing a provenance signature with one or more data points of the second training dataset; applying each of the complete prediction model and the filtered prediction model to the new evaluation dataset; and comparing a performance of applying the complete prediction model to the new evaluation dataset to a performance of applying the filtered prediction model to the new evaluation dataset to determine whether the performance of applying the filtered prediction model to the new evaluation dataset exceeds the performance of applying the complete prediction model to the new evaluation dataset. In response to determining the performance of applying the filtered prediction model to the new evaluation dataset exceeds the performance of applying the complete prediction model to the new evaluation dataset, the method includes: designating as poisonous one or more data points, in both the training dataset and the full evaluation dataset, the one or more data points having a same provenance signature as: (1) the group of untrusted data points excluded from the second training dataset; and (2) the data points removed from the full evaluation dataset based on sharing the provenance signature with the one or more data points of the second training dataset. The method still further includes removing the one or more poisonous data points from the training dataset and the full evaluation dataset; recombining the training dataset and full evaluation dataset after removing the one or more poisonous data points therefrom so as to create a final filtered training set; and training a final prediction model using the final filtered training set.

Corresponding systems and computer program products represent additional embodiments of the inventive concepts recited herein, and may be employed in any combination, including any combination of features as described with reference to the exemplary methods recited above and shown in FIGS. 10-11, in various embodiments.

General Computing/Networking Concepts

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
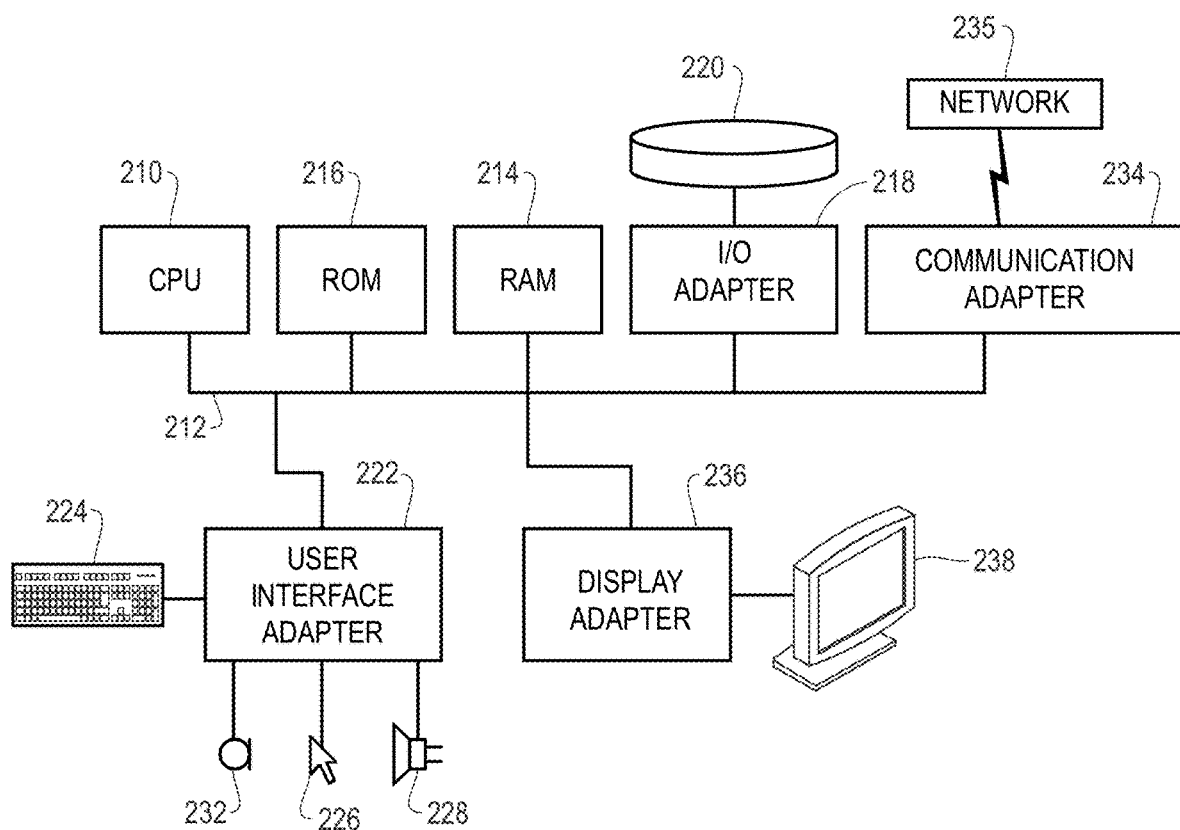
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

As discussed herein, logic may be implemented as a method on any device and/or system or as a computer program product, according to various embodiments.

In various embodiments, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The presently disclosed inventive concepts feature a unique, novel approach to detecting poison attacks on ML systems and algorithms. It will be understood upon reading the present descriptions that poison attacks may be addressed in different manners depending on the nature of the available data points. For example, where trusted data are available, it is possible to rely on the trusted data as a ground "truth" against which to evaluate different portions of untrusted data and detect poison data points. On the other hand, if no trusted data points are available, detecting poison data points is much more challenging, and indeed has not been accomplished using existing techniques. Each approach is described in detail below according to various embodiments, and it should be understood these embodiments and individual features thereof may be used together in any combination or permutation to provide defense against poison attacks in a given ML environment.

Partially Trusted Datasets

In one approach, a provenance-based poisoning defense method is configured for environments where the collected data is partially trusted. In real-world scenarios, obtaining partially trusted training data can be achieved through manual curation of the collected data or through trusted sources of data. For example, the regulator could physically monitor certain sensors to ensure the integrity of the collected data, cryptographic protection may be applied to the collected data, etc. as described herein.

The methods for provenance-based poisoning defense of partially trusted datasets are agnostic to the specific supervised ML algorithm used, and may also be applied to unsupervised algorithms. The present descriptions focus on supervised learning algorithms for simplicity of evaluating and comparing performance of the trained models. However, it should be appreciated that the presently described inventive concepts are equally applicable to supervised and unsupervised learning algorithms.

In an exemplary implementation, methods for provenance-based poisoning defense of partially trusted datasets accept the following four components as input. First, a supervised (or unsupervised) ML algorithm, which may be any type of supervised or unsupervised ML algorithm known in the art. Second, a partially trusted training dataset collected for the purposes of training the ML classifier, which comprises, or alternatively consists of, a trusted dataset and an untrusted dataset. Third, a secure, trusted provenance dataset, which in one embodiment comprises, and in another embodiment consists of, provenance data. Preferably, the provenance data includes metadata associated with each data point in the untrusted portion of the training set. Fourth, a provenance feature that indicates the manner in which poisonous points will be concentrated in the untrusted portion of the dataset.

Figure 3:
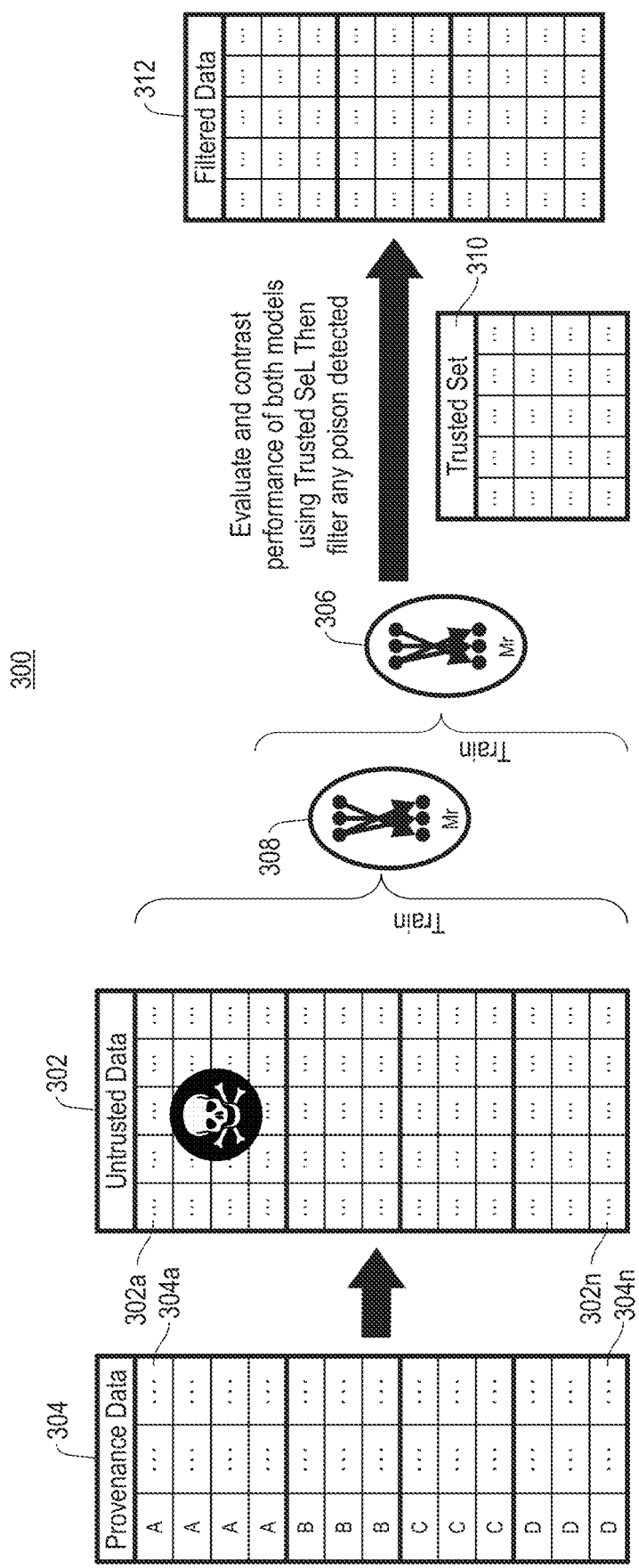
FIG. 3 illustrates an overview of a provenance defense for partially trusted datasets, according to one embodiment.

Given the above inputs, according to one embodiment the inventive techniques presented herein follow a process 300 substantially as depicted in FIG. 3, and as described in greater detail below regarding FIG. 10 and method 1000. The detailed pseudocode of the algorithm is presented below in Algorithm 1.

In accordance with the embodiment of FIG. 3, each data point $302a \ldots 302n$ in an untrusted training dataset 302 is linked with a corresponding provenance record $304a \ldots 304n$ of a provenance dataset 304. The provenance records $304a \ldots 304n$ are preferably linked with the corresponding data points $302a \ldots 302n$ as metadata associated with the data points data points $302a \ldots 302n$.

A provenance feature (e.g. features A-D as shown in FIG. 3, provenance data 304) is selected for evaluation of the corresponding data points. To detect and filter poisonous data, the untrusted dataset 302 is segmented so that each segment shares a same signature or value for the selected provenance feature. For example, the dataset could be segmented by the device or factory from which the data originated, e.g. using device ID, location information, network identifiers, or any other suitable type of provenance data as described herein and equivalents thereof that would be appreciated by a person having ordinary skill in the art upon reading the present disclosure.

Each segment of the untrusted dataset 302 is evaluated for poison by using an ML algorithm to train classifiers with and without that particular segment of the data. If the classifier trained without the particular segment (filtered model 306) performs better according to a selected performance metric than the classifier trained with the particular segment (unfiltered model 308) on the trusted test dataset 310, the particular segment is considered poisoned and removed from the untrusted dataset 302, ultimately yielding a filtered dataset 312 excluding poison data points from the untrusted dataset.

The performance metric used to evaluate the filtered and unfiltered models, in various approaches, may depend on the classifier's purpose, the needs of the user, and/or the goals of the adversary. An example of a performance metric would be prediction accuracy on a trusted hold-out test set, according to one embodiment.

The presently described inventive concepts also include a calibration procedure that explores the effect of removing a legitimate segment from the training data. This enables establishing a threshold for how much a given classifier's performance should be reduced when a segment is removed in order to deem that device poisonous. The calibration procedure operates by performing multiple trials. In one approach, an exemplary calibration procedure includes performing operations wherein: 1) one segment of data is randomly removed from the untrusted dataset 302 and one segment of legitimate data is selected at random from the trusted dataset 310; 2) classifiers are trained with and without the legitimate data; and 3) difference(s) in performance on the remaining trusted data points is/are stored.

Figure 5:
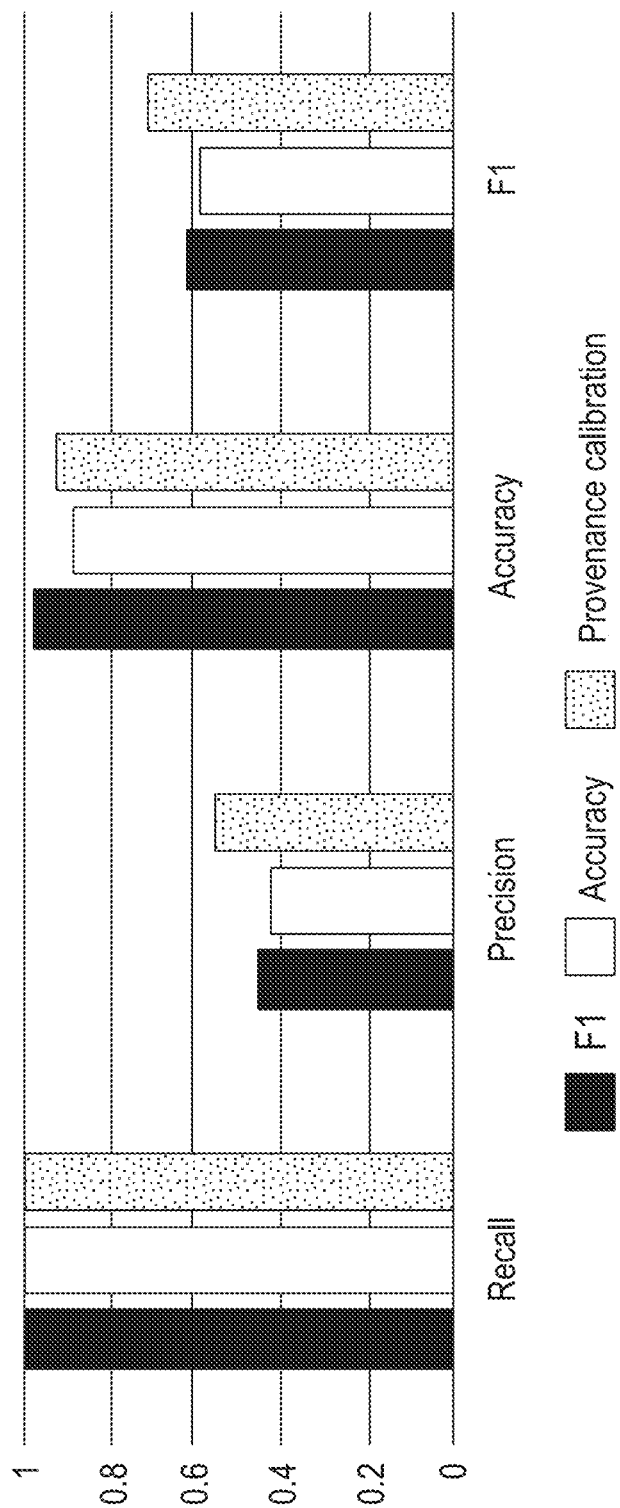
FIG. 5 is a graph demonstrating the effect of increasing the size of a trusted dataset on average accuracy of the ML algorithm, according to one embodiment.
Figure 6:
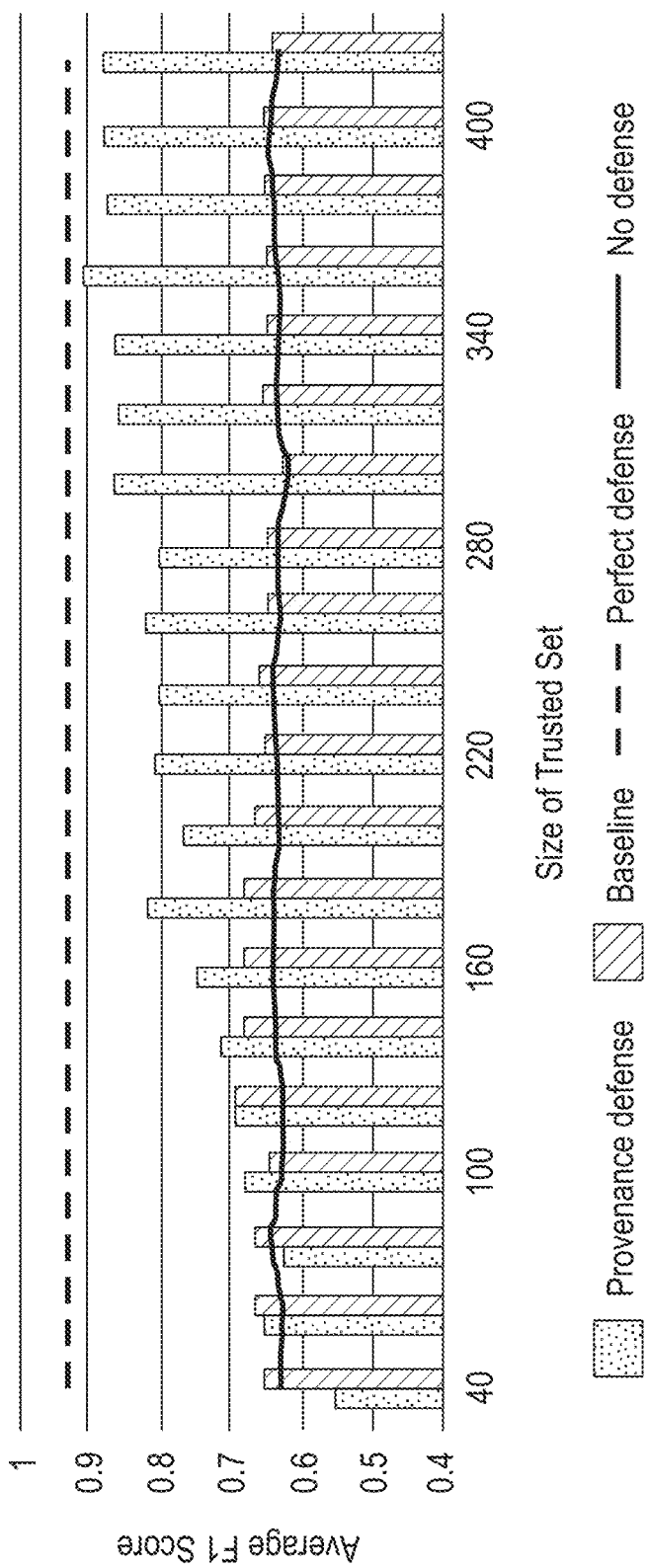
FIG. 6 is a graph showing the effect of increasing percentage of compromised devices on the accuracy of the ML algorithm, according to one embodiment.

The user may conduct as many trials as is necessary to obtain a reasonable estimate of the distribution for the change in performance. Using this estimate, the user can choose a threshold depending on his/her needs. For instance, in one experimental evaluation of the inventive concepts presented herein, described in greater detail below with reference to FIGS. 5 and 6, 20 trials of the calibration procedure were employed. An untrusted segment was deemed poisonous if the change in performance was greater than the mean, plus one standard deviation of the change in performance during the calibration trials. This threshold can, of course, be adjusted to increase precision at the expense of recall or vice versa. Tuning this parameter using a cross-validation set is also an option, in some approaches. If the user is able to model the distribution of performance change in the calibration trials, conducting statistical tests of the hypothesis that an untrusted segment is legitimate allows adjusting the threshold value according to the modeled distribution and a p-value.

In scenarios with a large number of data segments, the effect of a single segment on the trained classifier may be negligible. In such cases, when evaluating a particular untrusted segment, an implementation of the inventive concepts described herein includes conducting multiple trials of the following procedure. First, 10 to 20 segments are randomly selected. A model is then trained on the randomly selected segments plus the segment being evaluated, while another model is trained only on the randomly selected segments. Performance of the two models is compared, and in at least one approach the procedure may be repeated several times in order to account for natural variance in the results. If the average change in performance is greater than the threshold value, the segment is deemed poisonous and filtered from the dataset.

Note that the above procedure can also be easily parallelized. The 10 to 20 randomly selected segments for all devices can be chosen prior to training. Once selected, all of the models (filtered and unfiltered) in the detection process can be trained independently in parallel.

As noted briefly above, Algorithm 1 presents pseudocode corresponding to one exemplary embodiment of provenance-based defense for partially trusted datasets. Data is segmented by provenance signature and for each data segment two models are trained: a $Model_{unfiltered}$ and a $Model_{filtered}$. In line 7, the difference in performance between the $Model_{unfiltered}$ and the $Model_{filtered}$ models is computed. The performance of each model is evaluated using trusted dataset $D_T$. Different performance metrics can be used for this purpose, including but not limited to F1-measure and accuracy. In line 8, E serves as a tunable parameter to determine how large the performance decrease should be to conclude a segment of data points is poisonous. Methodologies for computing E are discussed above regarding the calibration procedure and thresholds generated thereby. Algorithm 1 returns a set of tuples containing data points that are suspected of being poisonous, associated provenance signatures and corresponding expected loss in performance if the suspect data points are not filtered (i.e. removed from the untrusted dataset).

---

Algorithm 1 findPoisonDataPartiallyTrusted(D, $D_T$, $\mathcal{F}$, $\in$)

---

Input: D := all data points, $D_T$ := trusted data points (trusted set), $\mathcal{F}$ := Provenance signature (feature(s)) to be used for segmentation $\in$ := Tunable parameter
Output: Set of tuples containing data points that are suspected of being poisonous, their associated provenance and loss in performance.
1:    $\mathcal{P} \leftarrow \emptyset$
2:    $D_U \leftarrow D \setminus D_T$ {Untrusted data}
3:    F $\leftarrow$ segmentByProvenanceSignature($D_U$, $\mathcal{F}$)
4:    for all $\langle D_i, segment_i \rangle \in$ F do
5:        Model$_{filtered}$ $\leftarrow$ trainModel($D_U \setminus D_i$)
6:        Model$_{unfiltered}$ $\leftarrow$ trainModel($D_U$)
7:        $\omega \leftarrow$ performance(Model$_{filtered}$, $D_T$) − performance(Model$_{unfiltered}$, $D_T$) {Find performance reduction}
8:        if $\in$ < $\omega$ then
9:            $\mathcal{P} \leftarrow \mathcal{P} \cup \langle D_i, segment_i, \omega \rangle$ {Flag as suspicious}
10:       $D_U \leftarrow D_U \setminus D_i$ {Remove from training set}
11:       end if
12:    end for
13:    return $\mathcal{P}$

---

Figure 10:
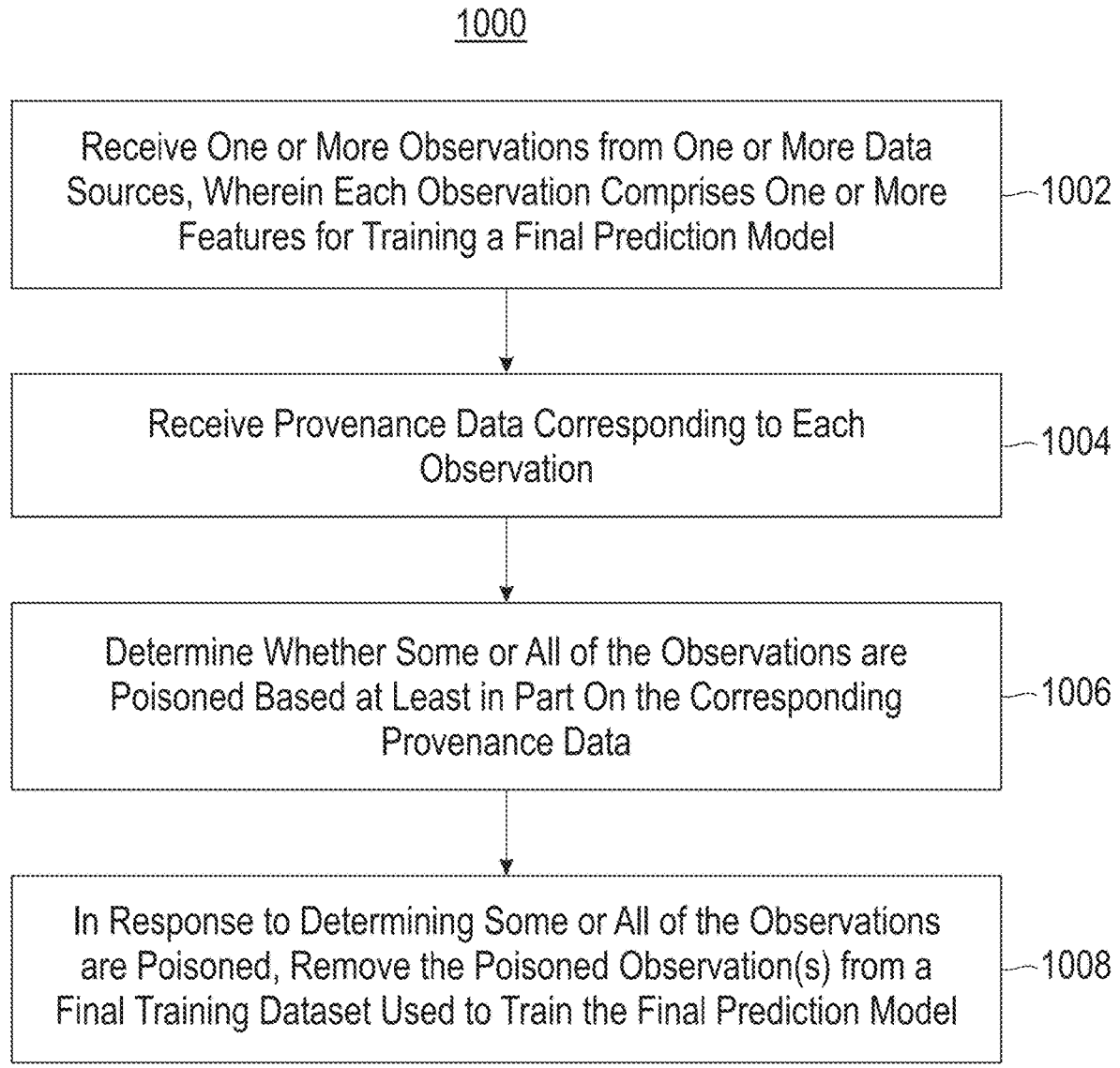
FIG. 10 illustrates a method for provenance-based defense against poison attacks, in accordance with one embodiment.

Accordingly, in one embodiment a method 1000 for provenance-based defense against poison attacks is shown in FIG. 10. The method 1000 may be performed in any suitable environment, including those shown in FIGS. 1-2 above. Moreover, in various embodiments the method 1000 may include additional or alternative operations and/or features to those shown in FIG. 10, and/or may exclude certain features and/or operations shown in FIG. 10.

In a preferred embodiment, method 1000 includes operation 1002, where one or more observations are received from one or more data sources. Each observation includes one or more features for training a final prediction model.

With continuing reference to the embodiment of FIG. 10, method 1000 involves receiving provenance data corresponding to each observation in operation 1004.

In operation 1006, method 1000 includes determining whether some or all of the observations are poisoned based at least in part on the corresponding provenance data.

In response to determining some or all of the observations are poisoned, removing the poisoned observation(s) from a final training dataset used to train the final prediction model in operation 1008.

Of course, method 1000 in various embodiments may include additional or alternative features and/or operations as those set forth above. The additional/alternative features and/or operations may include any suitable features and/or operations described herein, along with equivalents thereof that would be appreciated by a person having ordinary skill in the art upon reading the instant descriptions. The additional/alternative features and/or operations may be included in any suitable combination or permutation thereof, according to different approaches.

For instance, in one approach determining whether each observation is poisoned may include: determining a provenance signature for the provenance data corresponding to each of the observations; grouping observations characterized by a same provenance signature; generating a filtered training dataset excluding one or more of the groups of observations from the training dataset; and training a first prediction model corresponding to the final prediction model using the filtered training dataset.

In another approach, method 1000 may include training a second prediction model corresponding to the final prediction model using a complete training dataset comprising all of the observations; comparing a performance of the first prediction model against a performance of the second prediction model; and/or, in response to determining the performance of the second prediction model exceeds the performance of the first prediction model, determining the observations of the one or more groups excluded from the filtered training dataset are poisoned.

Preferably, the provenance data employed in the context of method 1000 are trusted data as defined hereinabove. Moreover, the provenance data may be associated with the observations as metadata, and/or may identify an origin of the observation with which the provenance data are associated.

With continuing reference to method 1000, in one approach observations include a trusted dataset of data points and an untrusted dataset of data points, such that the method 1000 is performed on a partially untrusted dataset.

Further still, method 1000 may include optionally performing a calibration technique to facilitate determining an appropriate threshold difference between performance of a learning model (or other ML algorithm) on different datasets and which is indicative of poison data point(s) being present in one of the datasets. The calibration technique may include any features described hereinabove, and in one particular embodiment involves randomly removing a subset of the untrusted dataset of data points from the untrusted dataset of data points to generate a first calibration dataset; randomly selecting a subset of the trusted dataset of data points to generate a second calibration dataset; training a prediction model corresponding to the final prediction model using the first calibration dataset; training the prediction model using the first and second calibration datasets; computing a difference in a performance of the prediction model when trained using the first calibration dataset against a performance of the prediction model when trained using the first and second calibration datasets; and setting the threshold performance difference to a value greater than or equal to the difference in the performance of the prediction model when trained using the first calibration dataset versus the performance of the prediction model when trained using the first and second calibration datasets.

Fully Untrusted Datasets

A particular advantage of the presently described inventive concepts is the ability to detect poison attacks even in the absence of any trusted data.

In some scenarios, it is difficult or even infeasible to obtain a partially trusted dataset due to cost associated with manual data verification and real-time requirements that preclude data verification. To address these scenarios, the inventive concepts presented herein include a provenance-based poison detection mechanism that works even if all data collected for re-training is untrusted. To apply this implementation to fully untrusted datasets, the following procedure may be employed according to one embodiment.

Data is segmented by provenance signature, according to the various signatures capable of being represented for a selected provenance feature.

For each segment, a portion of the dataset is randomly assigned to the training dataset, and the rest of the data are assigned to the test dataset.

For each provenance signature within the scope of the selected provenance feature: a) train two models—one with all of the training data and one with a corresponding segment of the training data removed; b) evaluate both models on the test dataset with the corresponding segment removed; and c) permanently remove the segments from both the training and evaluation set if the model trained without the corresponding segment of the training data removed performed better than the model trained with all the training data. This method is described more formally below with reference to Algorithm 2.

Algorithm 2 presents exemplary pseudocode for one illustrative embodiment of a procedure for provenance-based defense of fully untrusted datasets. In this setting, all data received, $D_U$, is untrusted. For this reason, the first step is to randomly split $D_U$ into training and validation datasets, $D_{train}$, $D_{val}$, respectively (line 2). Then, data in $D_{train}$ and $D_{val}$ is segmented based on provenance signature as shown in lines 3 and 4. After that, in each iteration of the algorithm, a data segment in $\langle D_i;$ segment$_i\rangle$ in $F_{train}$ is evaluated. Two models are trained Model$_{filtered}$ (model trained without the evaluated segment in Ftrain) and Model$_{unfiltered}$. To assess the performance of these models, a validation set $D_{filteredVal}$ is selected from $D_{val}$ such that no data coming from the evaluated segment, is included. The difference in performance of the two models is then computed based on $D_{val}$ (line 10). In line 11, E serves as a tunable parameter (e.g. a calibration threshold determined as described above) received by the algorithm to determine how large the performance decrease should be to conclude a segment of data points is poisonous. In one embodiment, E can be tuned using a cross-validation set. The algorithm returns a set of tuples containing data points that are suspected of being poisonous, associated provenance data, and expected loss in performance if the suspect data points are not filtered out of the dataset.

---

Algorithm 2 findPoisonDataFullyUntrusted($D_U, \mathcal{F}$)

---

Input: $D_U$ := all data points (all are untrusted), $\mathcal{F}$ := Provenance signature (feature(s)) to be used for segmentation
Output: Set of tuples containing data points that are suspected of being poisonous, their associated provenance and loss in performance.
1:    $\mathcal{P} \leftarrow \emptyset$
2:    $\langle D_{train}, D_{val} \rangle \leftarrow$ splitRandomly($D_U$) {Get validation and training data sets}
3:    $F_{train} \leftarrow$ segmentByProvenanceSignature($D_{train}, \mathcal{F}$)
4:    $F_{val} \leftarrow$ segmentByProvenanceSignature($D_{val}, \mathcal{F}$)
5:    for all$\langle D_i$, segment$_i \rangle \in F_{train}$ do
6:       Model$_{filtered} \leftarrow$ trainModel($D_{train} \setminus D_i$)
7:       Model$_{unfiltered} \leftarrow$ trainModel($D_{train}$)
8:       $\langle D_{val_i}$, segment$_i \rangle \leftarrow$ getSegment($F_{val}$, segment$_i$)
9:       $D_{filteredVal} \leftarrow D_{val} \setminus D_{val_i}$
10:      $\omega \leftarrow$ performance(Model$_{filtered}$, $D_{filteredVal}$) − performance(Model$_{unfiltered}$, $D_{filteredVal}$)
11:      if $\in < \omega$ then
12:         $\mathcal{P} \leftarrow \mathcal{P} \cup \langle D_i$, segment$_i$, $\omega \rangle$ {Flag as suspecious}
13:         $D_{train} \leftarrow D_{train} \setminus D_i$ {Remove from training set}
14:         $D_{val} \leftarrow D_{val} \setminus D_{filteredVal}$ {Remove from validation set}
15:      end if
16:   end for
17:   return $\mathcal{P}$

---

By removing the corresponding points from the evaluation set when determining whether a particular segment is compromised, the inventive provenance-based approach prevents the data source from effectively manipulating its own evaluation. Otherwise, an adversary who has succeeded in compromising a particular device can use it not only to poison the ML classifier, but also to interfere with the evaluation process, allowing poisonous points to evade detection.

Note that without data provenance, there is no way to link the data in the training set to the data in the evaluation set and it is not clear how to remove the influence of poisonous data in the evaluation process. Accordingly, this ability to detect poison attacks even in fully untrusted datasets represents an improvement to computers' capability to detect and prevent malicious activity, and a significant improvement/benefit to the field of machine learning overall.

Targeted Attacks

A subset of attacks falling under the scope of "fully untrusted datasets" includes targeted attacks, which are particularly insidious in that the adversary may introduce data points that effectively hide or obfuscate the presence of other, potentially more harmful poisoned data points in the dataset.

For instance, assume a system including devices A and B collecting data points for evaluation by a machine learning algorithm to reach some decision (e.g. whether to issue warnings, restrictions, etc. to preserve air quality or reduce fire hazard, as described above). There are no trusted data available to guide the detection and mitigation of poison attacks. Accordingly, the absence of trusted datasets also opens the opportunity for an adversary to design a more targeted attack in which multiple signatures (e.g. devices or other sources of data) collude to disguise a poisoning attack or mislead its detection. While the above method for fully untrusted data prevents a compromised device A from influencing the evaluation of its own data points, it is still possible that another compromised device B could collude with device A by inserting points into the evaluation set that prevent device A from being detected as compromised. Likewise, device B could be used to insert points that cause legitimate devices to be detected as compromised. Exemplary varieties of targeted attacks, in various embodiments, include false positive attacks and false negative attacks, as well as "accuracy reduction attacks." It should be noted a given system may be subject to any number of different attacks and/or attack types, or to only one type of attack, in myriad embodiments.

False Negative Attacks

Consider the following false negative attack: device A inserts a set of points to shift the decision boundary and device B inserts points between the new, shifted decision boundary and the true decision boundary. When data points from device A are evaluated and removed, the decision boundary shifts back towards the true decision boundary. When this happens, the points from device B go from being classified correctly to classified incorrectly. This lowers the accuracy of the model trained without the data from device A, and it appears that A was providing legitimate points, when, in fact, they were poisonous.

To illustrate, a simple logistic regression simulation was performed using the following setup. First, 200 "legitimate" data points, $\{x_i; y_i\}$ were generated by sampling $\{x_i\}$ from a normal distribution with mean 0 and variance 10, and sampling $\{y_i\}$ from a distribution where $P(y_i=1|x_i)=(1/1+e^{-x_1})$. Next, 40 poisonous data points from device A were inserted, with x=5 and y=0 and another 40 poisonous data points from device B were inserted with x=2:5 and y=0. Half of the total 240 points are randomly selected to be the training dataset and half to be the test dataset. The training set, including poisonous data from both devices A and B, is shown in FIG. 4A. Training on this set results in a shifted decision boundary of 4.54. (The "true" decision boundary is at x=0.)

Figure 4B:
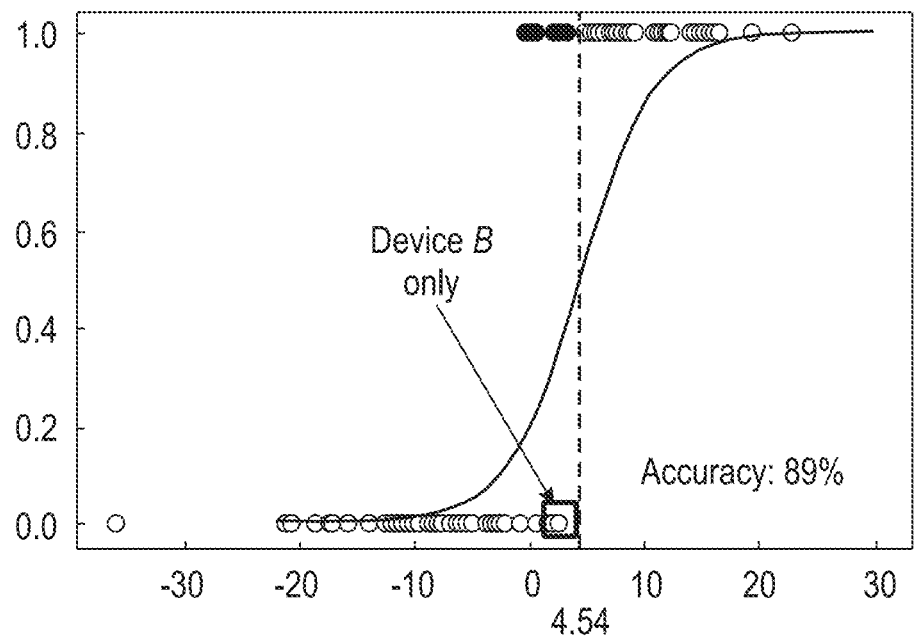
FIG. 4B is a graph showing performance of the logistic regression model on a test dataset excluding data points collected from poisoned data source A, according to one embodiment.
Figure 4C:
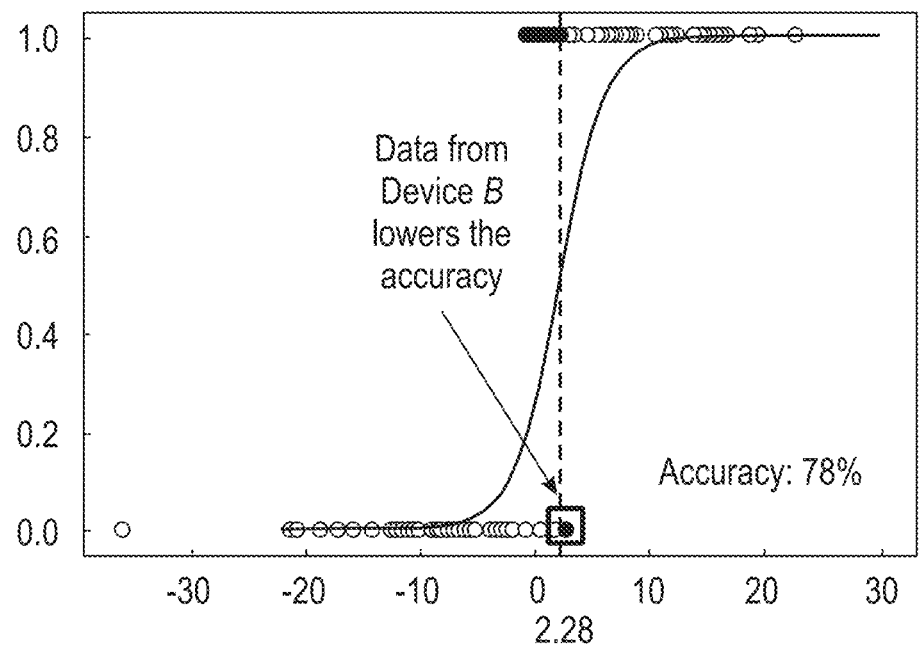
FIG. 4C is a graph showing performance of the logistic regression model on a test dataset excluding data points collected from poisoned data source A, and where the logistic regression model was retrained using a training set excluding data points from poisoned data source A, according to one embodiment.

When evaluating device A, data points originating from A are removed from the evaluation set as shown in FIG. 4B, and the full model yields an accuracy of 89% on this evaluation set. The partial model trained on the data without device A is shown in FIG. 4C. Notably, the accuracy on the evaluation set for the partial model shown in FIG. 4C is 78%, since device B's points go from being classified correctly to incorrectly. Removing device A actually dropped the accuracy, even though device A was poisoned. As a result, A would evade detection thanks to points inserted by B.

False Positive Attacks

Figure 4D:
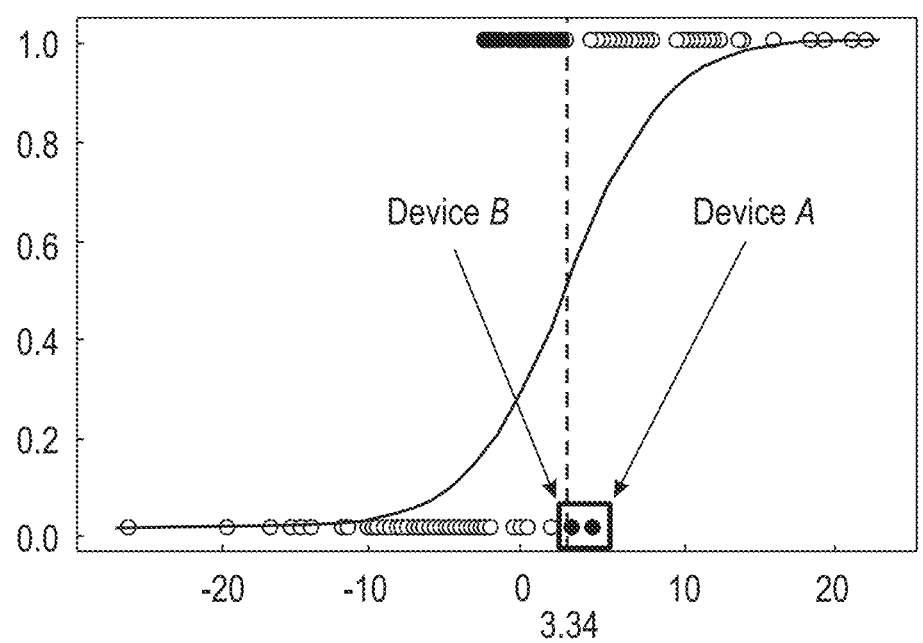
FIG. 4D is a graph showing an example training dataset including at least one poisoned data point from a poisoned data source B, and a corresponding logistic regression model, according to another embodiment.
Figure 4E:
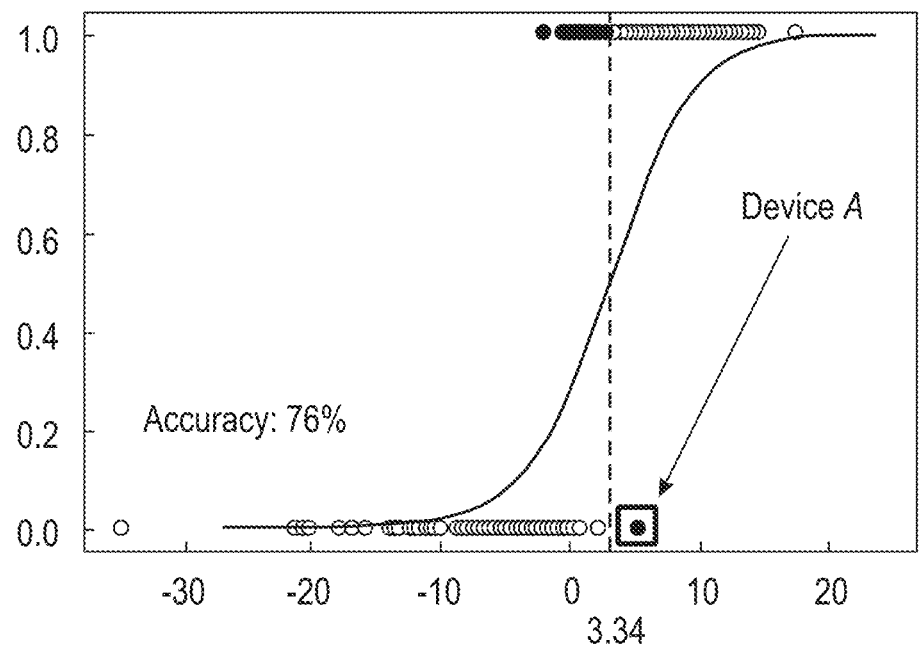
FIG. 4E is a graph showing performance of the logistic regression model on a test dataset excluding data points collected from poisoned data source B, according to another embodiment.
Figure 4F:
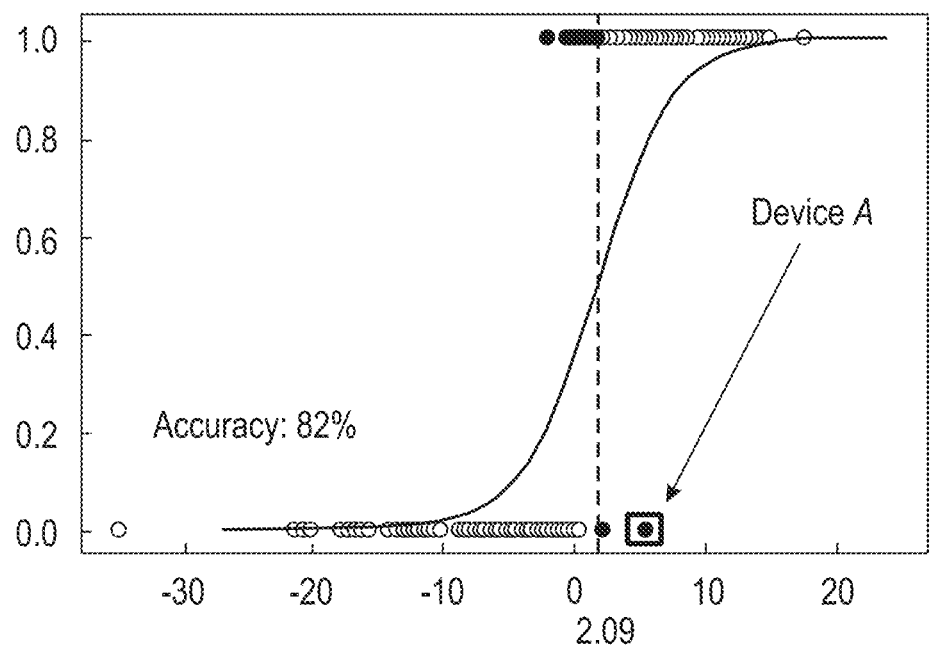
FIG. 4F is a graph showing performance of the logistic regression model on a test dataset excluding data points collected from poisoned data source B, and where the logistic regression model was retrained using a training set excluding data points from poisoned data source B, according to one embodiment.

A similar attack designed to generate false positives may involve device B inserting points just outside the decision boundary, further away from the true decision boundary. In this case, when the data from a legitimate sensor is removed from the training set, the trained model will have a decision boundary that shifts further away from the true boundary. When this happens, the points inserted by device B that end up in the test dataset will shift from being classified incorrectly to being classified correctly. As a result, it appears that the legitimate sensor was poisonous, when in fact it was not. To demonstrate, a similar simulation to the one shown in FIGS. 4A-4C was conducted, and the corresponding results are shown in FIGS. 4D-4F.

In both false positive and false negative attacks, device B's data points are inserted towards the shifted, poisoned decision boundary. Therefore, device B's points "look like" typical poison points, and should result in detection of the fact that device B has been compromised. As demonstrated in FIGS. 4D-4F, the presently described provenance-based defenses are indeed able to detect that device B is compromised in the above logistic regression example.

Thus, a simple defense against a false negative attack would be to simply re-check devices that were deemed legitimate whenever a device is deemed poisoned. Similarly, a simple defense against the false positive attack would be to simply re-check devices that were deemed poisonous when a device is deemed poisonous.

Clearly, this increases the computational complexity with respect to the number of devices k from the order of O(k) to O(k$^2$). However, there are strategies to reduce the amount of computation. For example, in one embodiment sorting the devices by some measure of how close their data points are to the shifted decision boundary, and evaluating each device according to this order ensures that devices attempting the above targeted attacks are likely to be checked earlier in the process (since both attacks require that data points be inserted close to the shifted decision boundary).

Accuracy Reduction Attacks

As understood herein, an accuracy reduction attack is any type of attack that causes the ML model to misclassify inputs. For example, without poison training the model would get an overall accuracy of 90%, while leaving the poison in would result in an accuracy drop to 80%, in one implementation.

Figure 11:
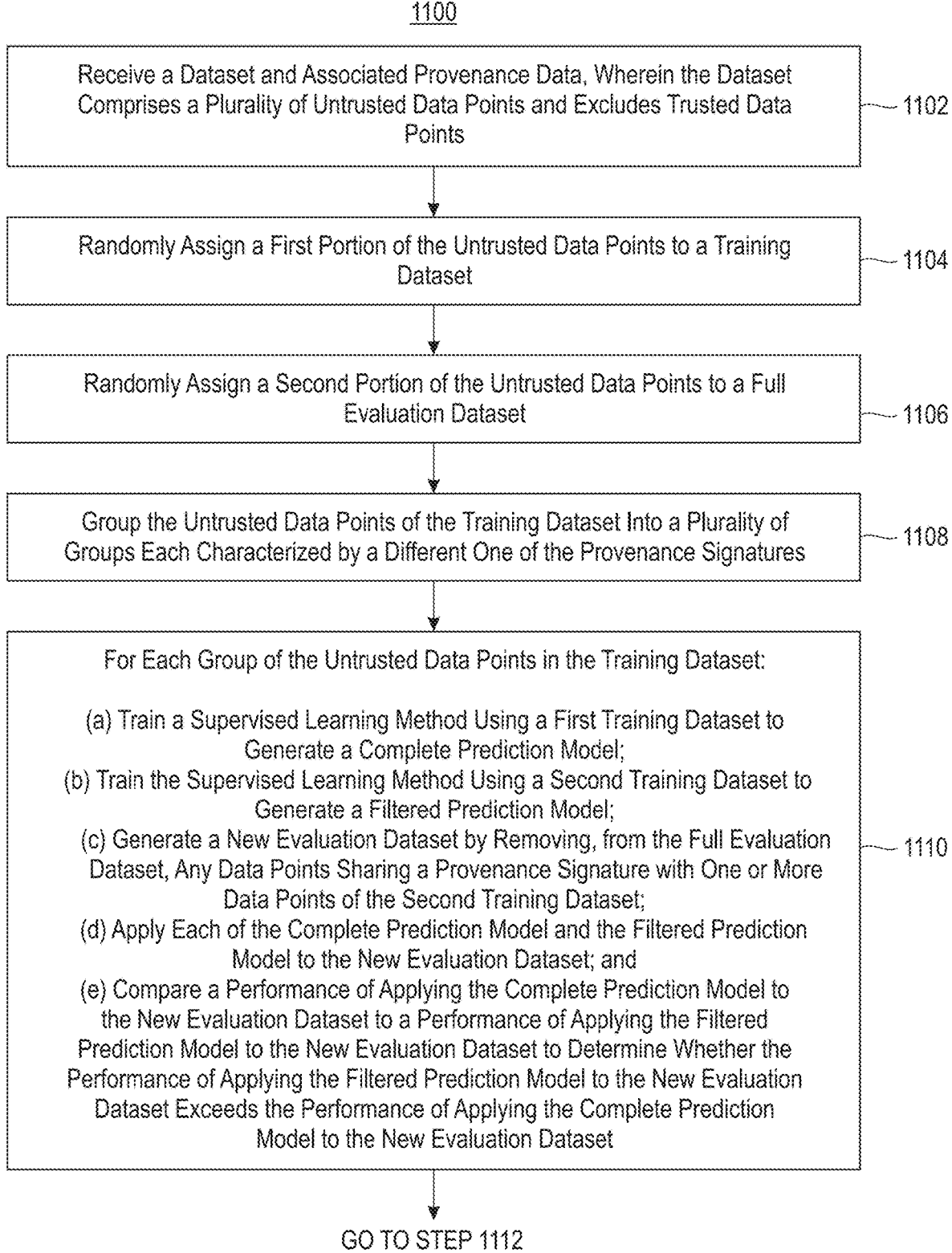
FIG. 11 illustrates a method for provenance-based defense against poison attacks in a fully untrusted data environment, in accordance with one embodiment.
Figure 11:
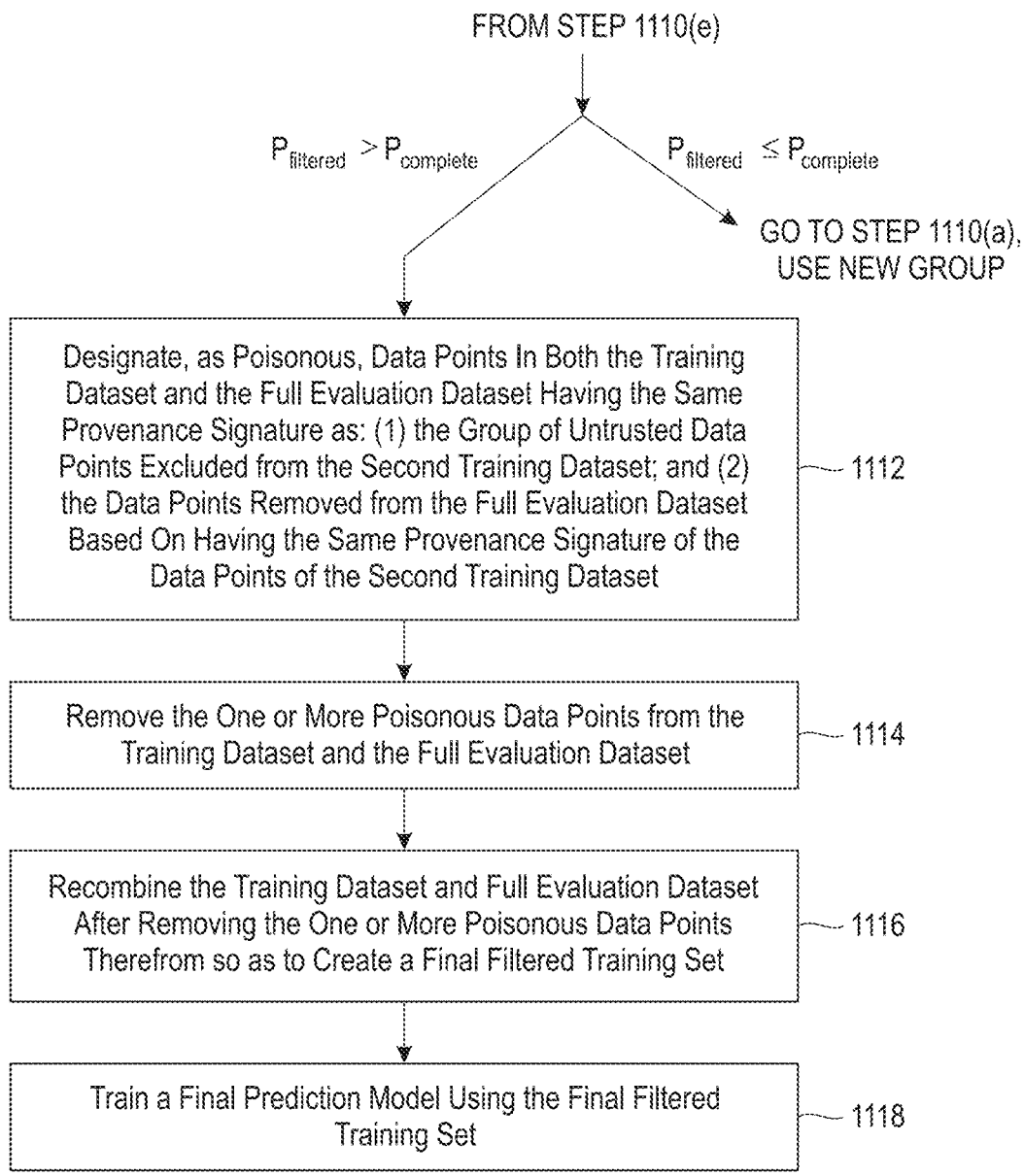

Accordingly, whether defending against targeted attacks or other poison attacks, in one embodiment a method 1100 for provenance-based defense against poison attacks in a fully untrusted data environment is shown in FIG. 11. The method 1100 may be performed in any suitable environment, including those shown in FIGS. 1-2 above. Moreover, in various embodiments the method 1100 may include additional or alternative operations and/or features to those shown in FIG. 11, and/or may exclude certain features and/or operations shown in FIG. 11.

In a preferred embodiment, method 1100 includes operation 1102, where a dataset and associated provenance data are received, e.g. at a computer. The dataset includes a plurality of untrusted data points and excludes trusted data points. Moreover, each untrusted data point is associated with one or more provenance signatures of the provenance data.

With continuing reference to the embodiment of FIG. 11, method 1100 involves randomly assigning a first portion of the untrusted data points to a training dataset in operation 1104, and randomly assigning a second portion of the untrusted data points to a full evaluation dataset in operation 1106.

In operation 1108, the untrusted data points of the training dataset are grouped into a plurality of groups each characterized by a different one of the provenance signatures. The untrusted data points of each group are characterized by a same one of the provenance signatures.

Method 1100 also includes operation 1110, in which, for each group of the untrusted data points in the training dataset: a supervised learning method is trained using: (1) a first training dataset to generate a complete prediction model in operation 1110(a), and (2) a second training dataset to generate a filtered prediction model in operation 1110(b). The first training dataset includes all of the untrusted data points; and the second training dataset excludes the group of the untrusted data points. In operation 1110(c) of method 1100, a new evaluation dataset is generated by removing, from the full evaluation dataset, any data points sharing a provenance signature with one or more data points of the second training dataset. The complete prediction model generated in operation 1110(a) and the filtered prediction model generated in operation 1110(b) are each applied to the new evaluation dataset in operation 1110(d). The performance of each prediction model as applied to the new evaluation dataset is compared in operation 1110(e).

Further still, in operation 1112, and in response to determining, based on operation 1110(e), that the performance of the filtered prediction model $P_{filtered}$ exceeds the performance of the complete prediction model $P_{complete}$ when each are applied to the new evaluation dataset, i.e., $P_{filtered} > P_{complete}$, method 1100 involves: designating as poisonous all data point(s) in the training dataset and all data point(s) in the full evaluation dataset that have a same provenance signature as: (1) the group of untrusted data points excluded from the second training dataset; and (2) the data points removed from the full evaluation dataset based on the fact that those data points share the same provenance signature with the one or more data points of the second training dataset.

If, on the other hand, the determination reached in operation 1112 is that the performance of applying the filtered prediction model $P_{filtered}$ to the new evaluation dataset does not exceed the performance of applying the complete prediction model $P_{complete}$ to the new evaluation dataset, i.e. $P_{filtered} \leq P_{complete}$, then no data points are designated as poisonous within the given group of untrusted data points used to train the supervised learning method in operations 1110(a) and 1110(b). A new group of the untrusted data points is evaluated per operations 1110(a)-1110(e) and 1112 subsequently, until all such groups of untrusted data points are evaluated, in preferred approaches.

Operation 1114 of method 1100 includes removing any data points designated as poisonous from the training dataset and the full evaluation dataset, while operation 1116 involves recombining the training dataset and full evaluation dataset after removing the poisonous data point(s) therefrom so as to create a final filtered training set. According to an aspect of the presently disclosed inventive concepts, operations 1114 and 1116 are performed after evaluating all of the untrusted data groups, but these operations may be performed after evaluating each of the untrusted data groups in accordance with alternative aspects, e.g. in an iterative fashion.

Method 1100 also includes training a final model using the final filtered training set in operation 1118.

Of course, method 1100 in various embodiments may include additional or alternative features and/or operations as those set forth above. The additional/alternative features and/or operations may include any suitable features and/or operations described herein, along with equivalents thereof that would be appreciated by a person having ordinary skill in the art upon reading the instant descriptions. The additional/alternative features and/or operations may be included in any suitable combination or permutation thereof, according to different approaches.

For instance, in one embodiment method 1100 also includes receiving a learning model. The learning model may be supervised, or unsupervised, in various approaches.

In another embodiment, the training dataset and the full evaluation dataset may comprise equal numbers of the untrusted data points.

In various approaches, and similar to method 1000 described above, the provenance data may be trusted data. Moreover, the provenance data may be associated with the untrusted data points as metadata, and/or identify an origin of the untrusted data point with which the provenance data are associated.

In more approaches, the untrusted data points may each include one or more features for training a final prediction model; and/or the final prediction model may be based on a supervised learning model.

In still more approaches, the poison attack may be or include a targeted attack, which in turn may include a false negative attack, a false positive attack, or both. Different considerations and techniques for detecting poison attacks apply to each scenario, as described in greater detail hereinabove.

Method 1100 may optionally include performing a calibration technique substantially as described hereinabove, in accordance with still further embodiments.

Experimental Evaluation

Figure 8A:
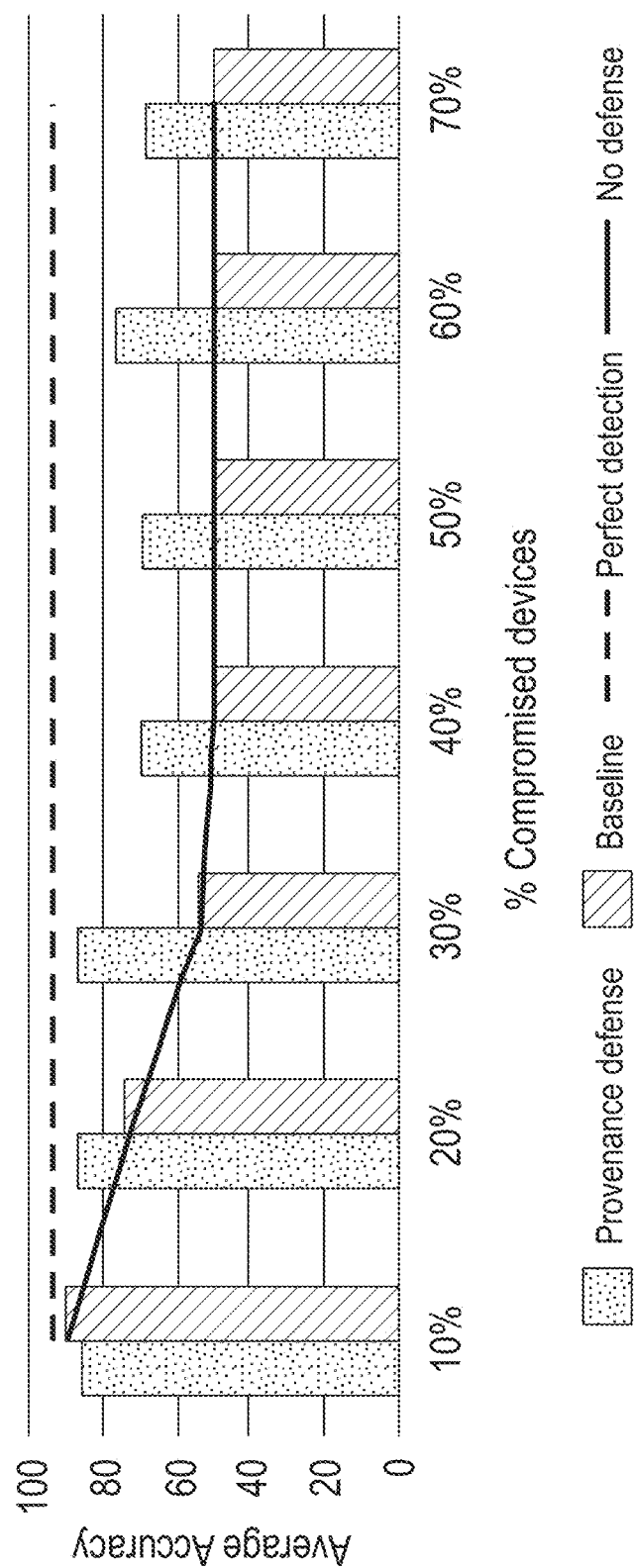
FIG. 8A is a chart illustrating an effect of increasing the size of a trusted dataset on average accuracy of provenance-based defense against poison attacks, according to one embodiment.
Figure 8B:
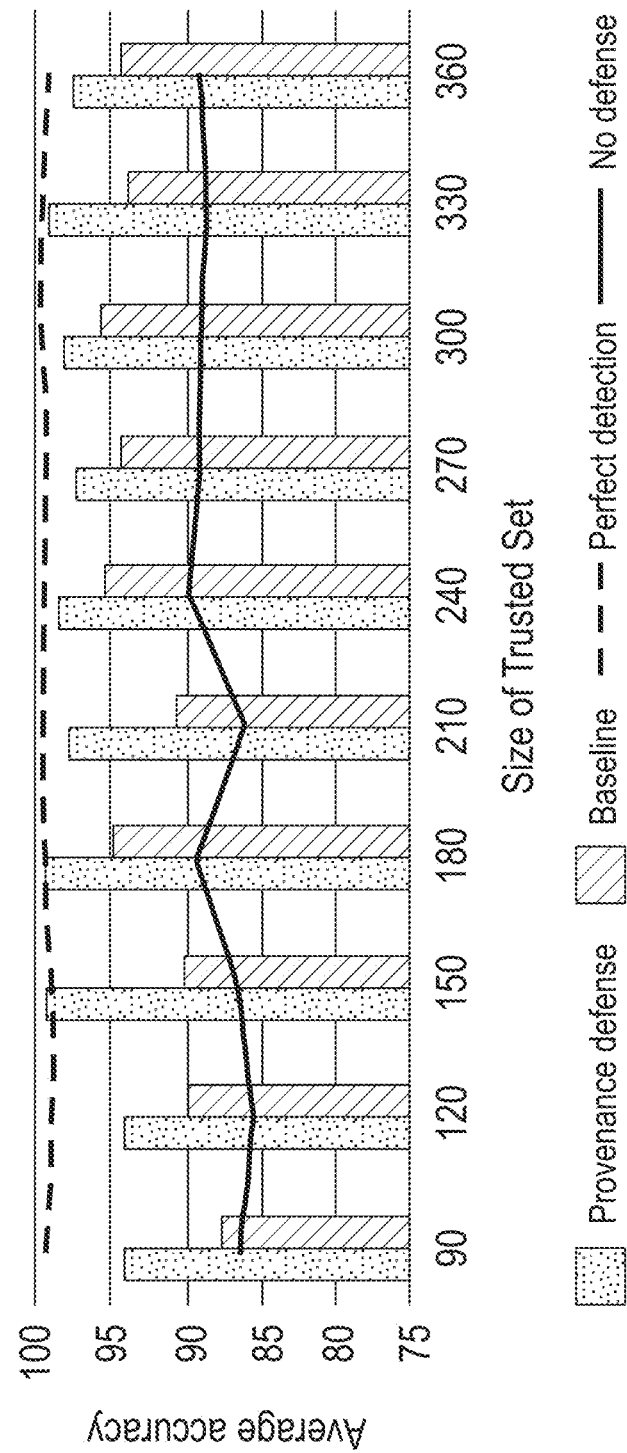
FIG. 8B is a chart illustrating an effect of increasing the size of a trusted dataset on average accuracy of provenance-based defense against poison attacks, according to another embodiment.
Figure 9:
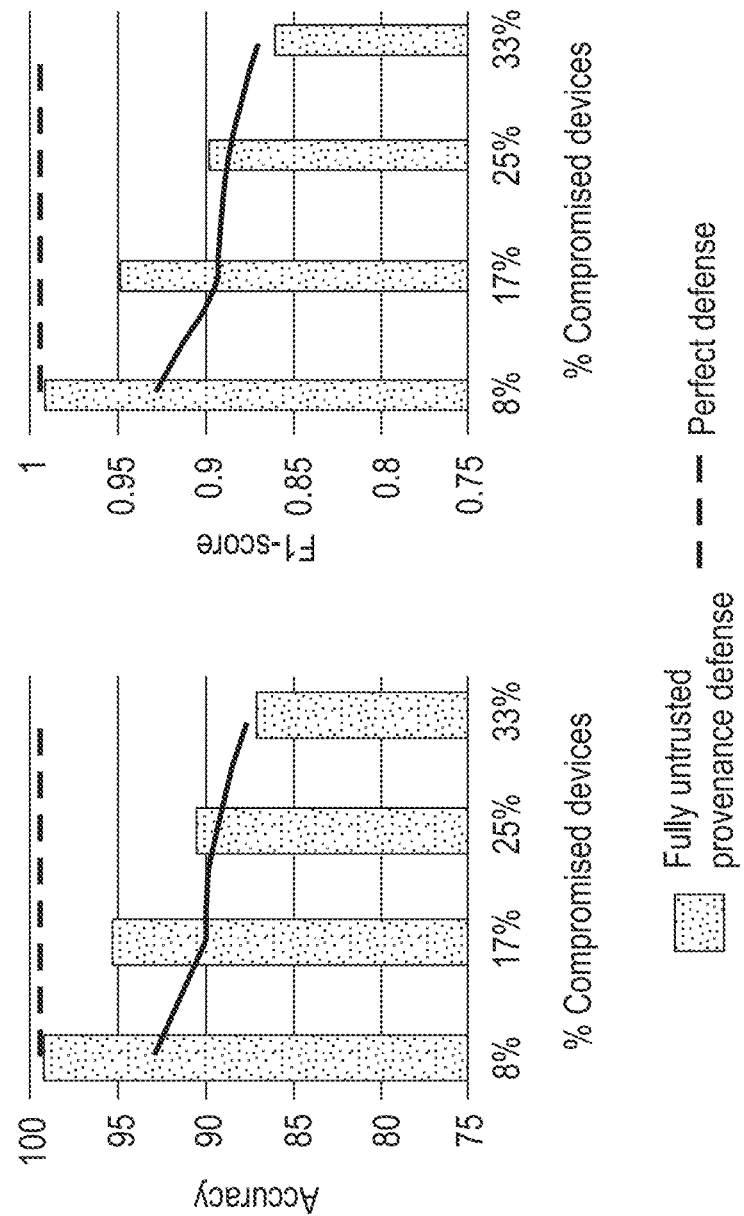
FIG. 9 is a graph depicting accuracy and F-score of a provenance-based defense against poison attacks in a fully untrusted data environment, according to one embodiment.

Now with reference to FIGS. 5-9, based on experimental evaluation of the presently described inventive techniques against two known types of poison attack, several performance characteristics were revealed. The experimental evaluation simulates an Internet of Things (IoT) scenario in which many devices/sensors contribute data points for evaluation by an ML system/algorithm. In FIGS. 5-8, the inventive provenance-based techniques are compared against a calibrated RONI algorithm operating on the same synthetic dataset(s), while in FIG. 8, the performance of the inventive provenance-based techniques is further compared to perfect defense and no defense, and in FIG. 9 compared exclusively to perfect defense and no defense (given RONI is cannot operate on fully untrusted datasets).

To evaluate the performance of the inventive techniques, several metrics were investigated: the effect of the size of the trusted dataset in a partially trusted environment (FIG. 5); the impact of increasing amounts of poison in the untrusted dataset (FIG. 6); the runtime (FIG. 7); the effect of increasing the size of a trusted dataset on average accuracy of provenance-based defense against poison attacks (FIG. 8); and accuracy and F1-score of a provenance-based defense against poison attacks in a fully untrusted data environment (FIG. 9).

Since the trusted evaluation set is a crucial element of both RONI and the presently described embodiments, in the context of partially trusted environments, a first experiment assessed the amount of trusted data that necessary to obtain good performance. In this experiment, the number of total legitimate training points was set to 1000 and the number of poisonous training points to 200. The total number of honest and dishonest devices were kept to ten and two, respectively. The results, shown in FIG. 6, indicate that the provenance defense according to this embodiment needed at least 100 data points in the trusted dataset before seeing an improvement over having no defense. By 380 data points, the provenance-based defense converges to accuracy that is nearly equal to perfect detection. In nearly all cases, the provenance defense outperforms the calibrated RONI baseline technique.

To investigate the impact of increasing amounts of poison in the untrusted dataset, 1000 total training points and 10 devices were employed, fixing the number of data points per device to 100. The amount of poison in each trial was varied by varying the number of compromised devices from 1 to 7. The number of data points in the trusted dataset was set at 300. The results shown in FIG. 8A indicate the inventive concepts presented herein generally outperform the calibrated RONI baseline and are able to improve the performance of the final classifier, even as the percentage of poisonous data reaches 70%.

Figure 7:
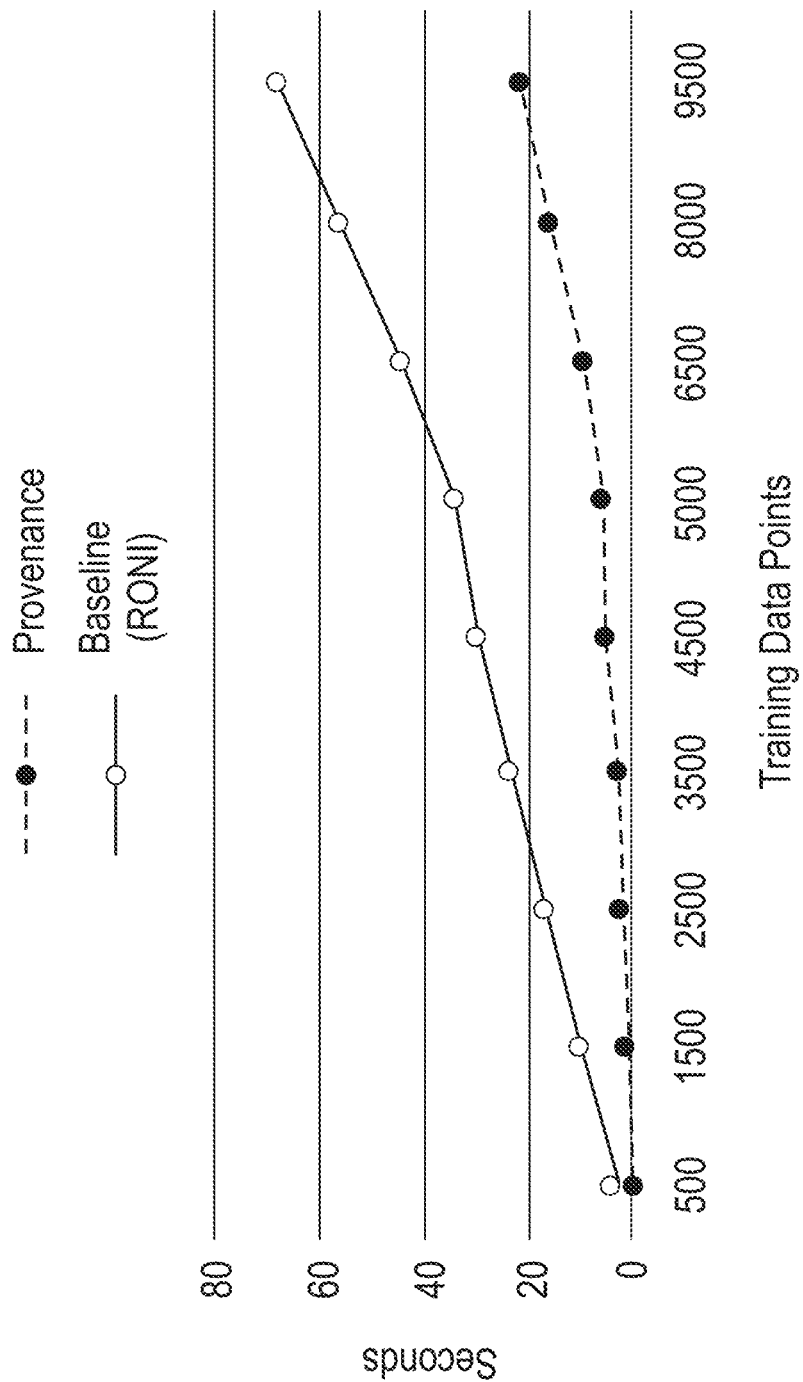
FIG. 7 is a graph demonstrating computational efficiency of the presently described inventive concepts relative to number of training data points, as compared to a conventional data protection algorithm, according to one embodiment.

FIG. 7, as mentioned above, shows the relative runtime of provenance-based defense versus the calibrated RONI baseline, according to one experiment. As noted above, the presently described inventive approaches generally exceed RONI's efficiency by a factor of 2-3.

FIG. 8B presents the effect of increasing the trusted dataset size, keeping the rest of the parameters constant. Even at 90 data points, the provenance defense greatly improves the performance of the final classifier. In contrast, at least 120 data points are needed before the baseline is able to improve over no defense. By 150 data points, the ability of the provenance methods as described herein with respect to improving the model accuracy converges and performs nearly as well as perfect detection. The results shown in FIG. 8B addresses the same general question as described above with reference to FIG. 8A above. However, the experimental results shown in FIG. 8B were achieved using a different dataset and poisoning method than employed for the experiment reflected in FIG. 8A.

Referring now to FIG. 9, in fully untrusted environments, the evaluation set can be contaminated with poisonous data. As a result, the ability of the presently described techniques to detect poisonous data is a function of the proportion of the collected data that is poisonous. The experimental results shown in FIG. 9 are from evaluating the ability of the presently described techniques to filter poisonous data as the untrusted data set becomes increasingly poisoned.

Since Calibrated RONI requires a trusted dataset, it could not be used as a baseline in fully untrusted environments. Instead, performance is compared to perfect detection and no-defense. When less than 25% of the data is poisoned, the inventive concepts presented herein are able to successfully increase the performance of the final classifier.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for provenance-based defense against poison attacks, the method comprising:
    receiving one or more observations from one or more data sources, wherein each observation comprises one or more features for training a final prediction model;
    receiving provenance data corresponding to each observation;
    determining whether some or all of the observations are poisoned based at least in part on the corresponding provenance data; and
    in response to determining some or all of the observations are poisoned, removing the poisoned observation(s) from a final training dataset used to train the final prediction model, and
    wherein determining whether each observation is poisoned comprises:
        determining a provenance feature for the provenance data corresponding to each of the observations;
        grouping observations characterized by a same provenance signature of the determined provenance feature;
        generating a filtered training dataset excluding one or more of the groups of observations from the training dataset; and
        training a first prediction model corresponding to the final prediction model using the filtered training dataset.

2. The computer-implemented method as recited in claim 1, further comprising training a second prediction model corresponding to the final prediction model using a complete training dataset comprising all of the observations.

3. The computer-implemented method as recited in claim 2, further comprising:
    comparing a performance of the first prediction model against a performance of the second prediction model; and
    in response to determining the performance of the second prediction model exceeds the performance of the first prediction model, determining the one or more groups of observations excluded from the filtered training dataset are poisoned.

4. The computer-implemented method as recited in claim 1, wherein the provenance data are trusted data.

5. The computer-implemented method as recited in claim 1, wherein the provenance data are associated with the observations as metadata.

6. The computer-implemented method as recited in claim 1, wherein the provenance data identify an origin of the observation with which the provenance data are associated.

7. The computer-implemented method as recited in claim 1, wherein the one or more observations comprise a trusted dataset of data points and an untrusted dataset of data points.

8. A computer-implemented method for provenance-based defense against poison attacks, the method comprising:
    receiving one or more observations from one or more data sources, wherein the one or more observations comprise a trusted dataset of data points and an untrusted dataset of data points, and wherein each observation comprises one or more features for training a final prediction model;
    receiving provenance data corresponding to each observation;
    determining whether some or all of the observations are poisoned based at least in part on the corresponding provenance data; and
    in response to determining some or all of the observations are poisoned, removing the poisoned observation(s) from a final training dataset used to train the final prediction model,
    determining a threshold performance difference indicative of poisoned observations, the determining comprising:
        randomly removing a subset of the untrusted dataset of data points from the untrusted dataset of data points to generate a first calibration dataset;
        randomly selecting a subset of the trusted dataset of data points to generate a second calibration dataset;
        training a prediction model corresponding to the final prediction model using the first calibration dataset;
        training the prediction model using the first and second calibration datasets;
        computing a difference in a performance of the prediction model when trained using the first calibration dataset against a performance of the prediction model when trained using the first and second calibration datasets; and
        setting the threshold performance difference to a value greater than or equal to the difference in the performance of the prediction model when trained using the first calibration dataset versus the performance of the prediction model when trained using the first and second calibration datasets.

9. The computer-implemented method as recited in claim 1, wherein the prediction model comprises a supervised machine learning algorithm.

10. The computer-implemented method as recited in claim 1, further comprising determining a threshold performance difference indicative of poisoned observations.

11. The computer-implemented method as recited in claim 10, wherein determining the threshold performance difference indicative of poisoned observations comprises:
    randomly removing a subset of untrusted dataset of data points from an untrusted dataset of data points to generate a first calibration dataset; and
    training a prediction model corresponding to the final prediction model using the first calibration dataset.

12. The computer-implemented method as recited in claim 10, wherein determining the threshold performance difference indicative of poisoned observations comprises:
    randomly selecting a subset of a trusted dataset of data points to generate a second calibration dataset; and
    training the prediction model using the second calibration dataset.

13. The computer-implemented method as recited in claim 10, wherein determining the threshold performance difference indicative of poisoned observations comprises:
    computing a difference in a performance of the prediction model when trained using a first calibration dataset against a performance of the prediction model when trained using first calibration dataset and a second calibration dataset; and
    setting the threshold performance difference to a value greater than or equal to the difference in the performance of the prediction model when trained using the first calibration dataset versus the performance of the prediction model when trained using the first and second calibration datasets.

14. The computer-implemented method as recited in claim 1, comprising training the final prediction model.

15. The computer-implemented method as recited in claim 1, wherein the final prediction model is based on a supervised learning model.

16. The computer-implemented method as recited in claim 1, wherein the poison attack comprises a targeted attack.

17. The computer-implemented method as recited in claim 16, wherein the targeted attack comprises a false negative attack.

18. The computer-implemented method as recited in claim 16, wherein the targeted attack comprises a false positive attack.

19. The computer-implemented method as recited in claim 16, wherein the targeted attack comprises an accuracy reduction attack.

20. A computer-implemented method for provenance-based defense against poison attacks in a fully untrusted data environment, the method comprising:

receiving a dataset and associated provenance data, wherein the dataset comprises a plurality of untrusted data points and excludes trusted data points, wherein each untrusted data point is associated with one or more provenance signatures of the provenance data;

randomly assigning a first portion of the untrusted data points to a training dataset;

randomly assigning a second portion of the untrusted data points to a full evaluation dataset;

grouping the untrusted data points of the training dataset into a plurality of groups each characterized by a different one of the provenance signatures, wherein untrusted data points of each group are characterized by a same one of the provenance signatures;

for each group of the untrusted data points in the training dataset:

training a supervised learning method using a first training dataset to generate a complete prediction model, wherein the first training dataset includes all of the untrusted data points;

training the supervised learning method using a second training dataset to generate a filtered prediction model, wherein the second training dataset excludes the group of the untrusted data points;

generating a new evaluation dataset by removing, from the full evaluation dataset, any data points sharing a provenance signature with one or more data points of the second training dataset;

applying each of the complete prediction model and the filtered prediction model to the new evaluation dataset;

comparing a performance of applying the complete prediction model to the new evaluation dataset to a performance of applying the filtered prediction model to the new evaluation dataset to determine whether the performance of applying the filtered prediction model to the new evaluation dataset exceeds the performance of applying the complete prediction model to the new evaluation dataset;

in response to determining the performance of applying the filtered prediction model to the new evaluation dataset exceeds the performance of applying the complete prediction model to the new evaluation dataset:

designating as poisonous one or more data points, in both the training dataset and the full evaluation dataset, the one or more data points having a same provenance signature as:

the group of untrusted data points excluded from the second training dataset; and the data points removed from the full evaluation dataset based on sharing the provenance signature with the one or more data points of the second training dataset; and removing the one or more poisonous data points from the training dataset and the full evaluation dataset; and recombining the training dataset and full evaluation dataset after removing the one or more poisonous data points therefrom so as to create a final filtered training set; and training a final prediction model using the final filtered training set.

\* \* \* \* \*